United States Patent
Lawrence

(10) Patent No.: US 11,744,252 B2
(45) Date of Patent: Sep. 5, 2023

(54) SELF-CLEARING DOUGH BALL LOADER

(71) Applicant: Lawrence Equipment Inc., South El Monte, CA (US)

(72) Inventor: Eric Clay Lawrence, So. El Monte, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 735 days.

(21) Appl. No.: 16/813,521

(22) Filed: Mar. 9, 2020

(65) Prior Publication Data

US 2021/0274793 A1    Sep. 9, 2021

(51) Int. Cl.
*A21C 9/08* (2006.01)
*A21C 11/00* (2006.01)

(52) U.S. Cl.
CPC .............. *A21C 9/085* (2013.01); *A21C 9/083* (2013.01); *A21C 11/006* (2013.01)

(58) Field of Classification Search
CPC ....... A21C 9/083; A21C 9/085; A21C 11/006; A21C 9/081; A21C 9/08; A21C 11/004
See application file for complete search history.

(56) References Cited

U.S. PATENT DOCUMENTS

| | | | | |
|---|---|---|---|---|
| 2,478,676 A | * | 8/1949 | Temple, Sr. | ........ B28B 13/0215 425/444 |
| 2,587,959 A | | 3/1952 | Biner | |
| 3,599,579 A | * | 8/1971 | Paaskesen | .............. A21C 9/081 425/290 |
| 4,421,542 A | | 12/1983 | Poad et al. | |
| 4,668,524 A | * | 5/1987 | Kirkpatrick | .............. A21C 9/08 425/388 |
| 5,252,055 A | * | 10/1993 | Mangiavacca | .......... A23L 7/111 425/383 |
| 5,396,833 A | * | 3/1995 | Atwood | ................... A21C 5/00 99/349 |
| 5,786,016 A | * | 7/1998 | Campbell | ................ A21C 7/01 425/332 |
| 6,015,584 A | | 1/2000 | Lawrence | |

(Continued)

FOREIGN PATENT DOCUMENTS

| | | |
|---|---|---|
| CN | 2258341 | 7/1997 |
| CN | 107618709 | 1/2018 |

(Continued)

OTHER PUBLICATIONS

Fenlon, Chris, [online], Double Dough Detection and Rejection (Bread, Hovis, Warburtons, Ingsmill), Jan. 15, 2014, retrieved on Mar. 9, 2020, <https://youtu.be/jpXth0Q2Ugw>, 3 pages [Video Submission].

(Continued)

*Primary Examiner* — Emmanuel S Luk
(74) *Attorney, Agent, or Firm* — Fish & Richardson P.C.

(57) ABSTRACT

A comestible processing machine including a loader plate comprising a plurality of spaced apart openings passing through the loader plate, a first flattener and a second flattener pivotably attached to the loader plate at each of the openings, a sensor configured to detect a comestible disposed within one or more of the plurality of openings, and an actuator coupled to the loader plate and configured to assist in removal of the comestible from the one or more of the plurality of openings.

26 Claims, 19 Drawing Sheets

(56) References Cited

U.S. PATENT DOCUMENTS

| | | | |
|---|---|---|---|
| 6,361,307 B1 | 3/2002 | Bernhard et al. | |
| 7,229,270 B2 * | 6/2007 | Schultz | A21C 7/00 |
| | | | 425/193 |
| 7,401,694 B2 | 7/2008 | Schultz | |
| 8,770,960 B2 * | 7/2014 | Mattias | A21C 11/006 |
| | | | 426/512 |
| 8,784,918 B2 | 7/2014 | Arevalo | |
| 9,477,220 B2 | 10/2016 | Shteinfeld et al. | |
| 2002/0089110 A1 | 7/2002 | Ely | |
| 2003/0068418 A1 * | 4/2003 | Bell | A21B 1/48 |
| | | | 426/523 |
| 2004/0241267 A1 | 12/2004 | Schultz | |
| 2006/0045945 A1 * | 3/2006 | Pack | A21C 9/066 |
| | | | 426/283 |
| 2008/0276810 A1 * | 11/2008 | Ceja | A21C 9/085 |
| | | | 99/485 |
| 2009/0074902 A1 | 3/2009 | Schultz | |
| 2009/0090253 A1 | 4/2009 | Wells et al. | |

FOREIGN PATENT DOCUMENTS

| | | |
|---|---|---|
| CN | 208297339 | 12/2018 |
| FR | 2 798 823 | 9/1999 |
| WO | WO 1999/46995 | 9/1999 |
| WO | WO 2015/170968 | 11/2015 |

OTHER PUBLICATIONS

International Search Report and Written Opinion in International Appln. No. PCT/US2021/021309, dated Jul. 9, 2021, 22 pages.
International Preliminary Report on Patentability in International Appln. No. PCT/US2021/021309, dated Sep. 22, 2022, 14 pages.

* cited by examiner

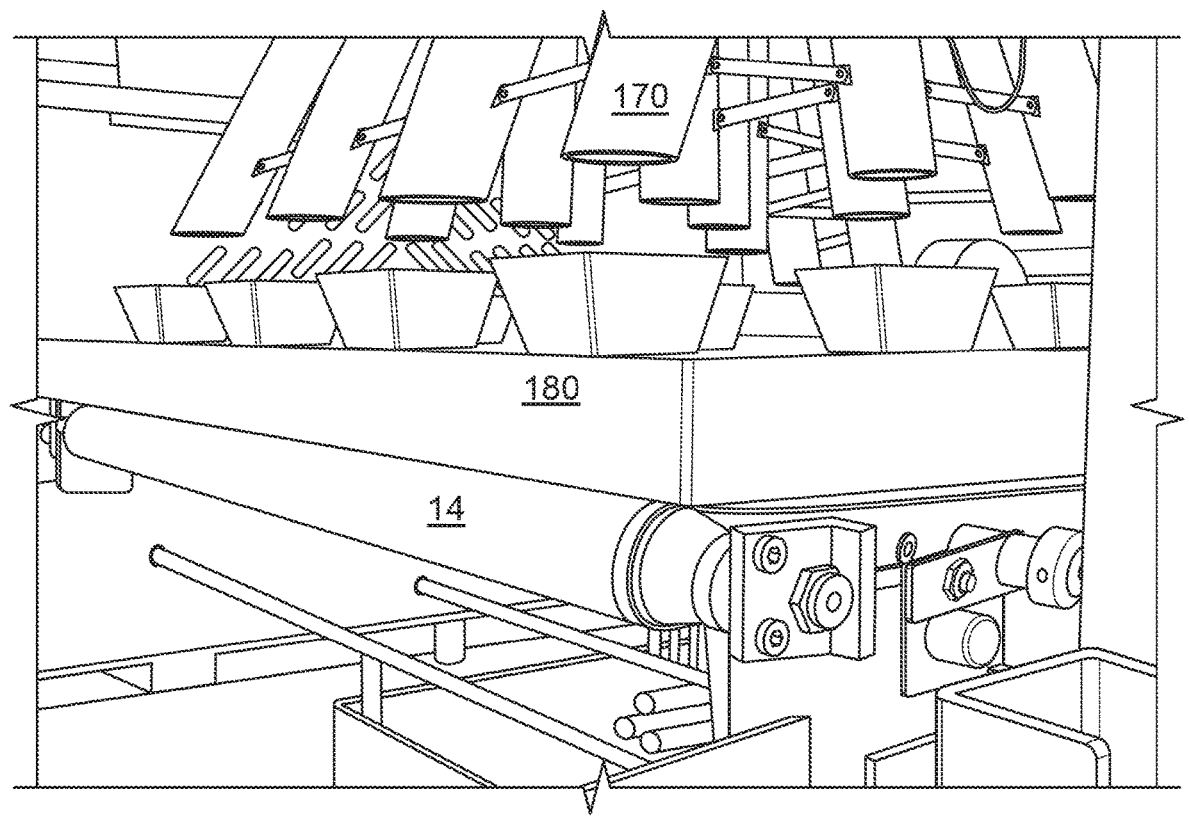
FIG. 7C
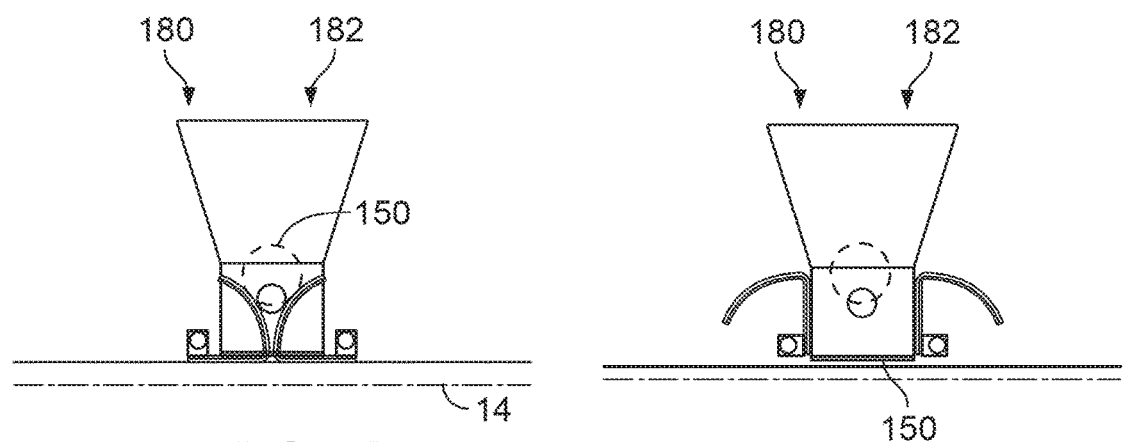
FIG. 7D
FIG. 7E

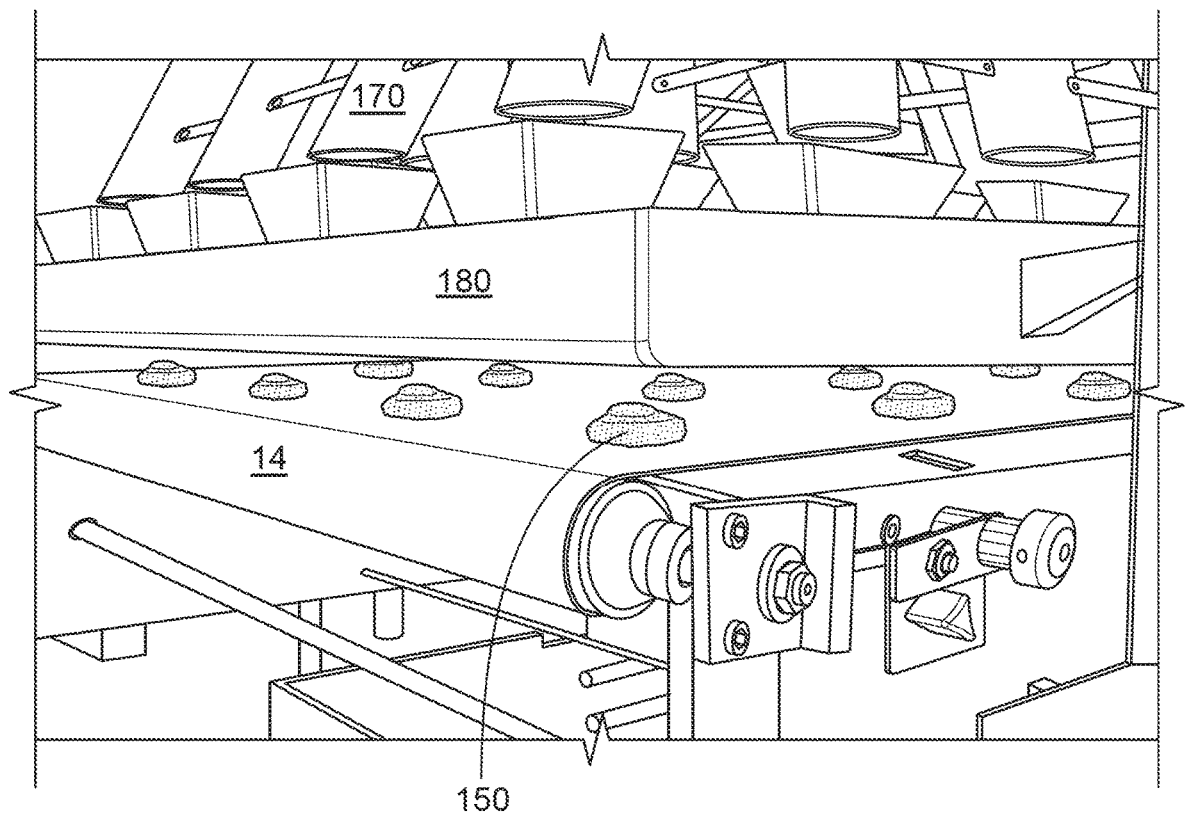
FIG. 7J
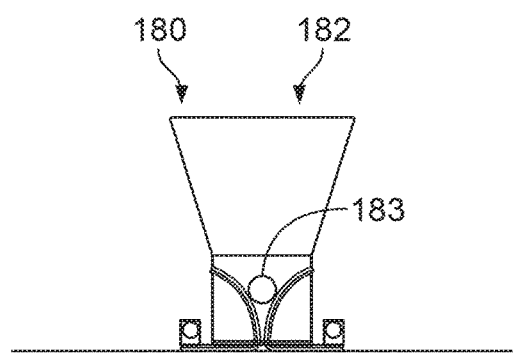
FIG. 7K

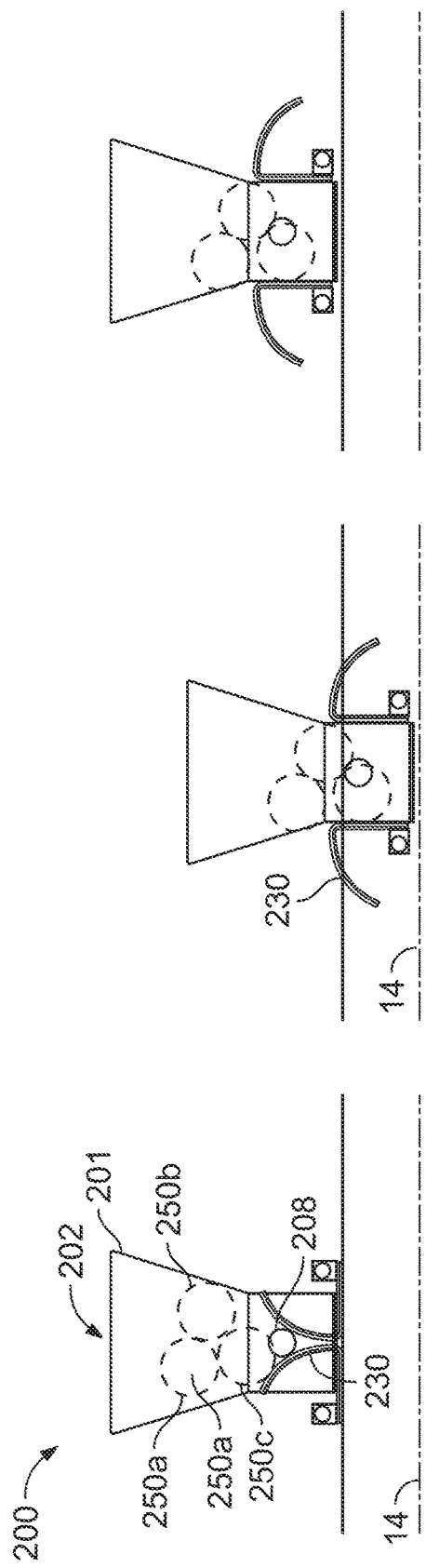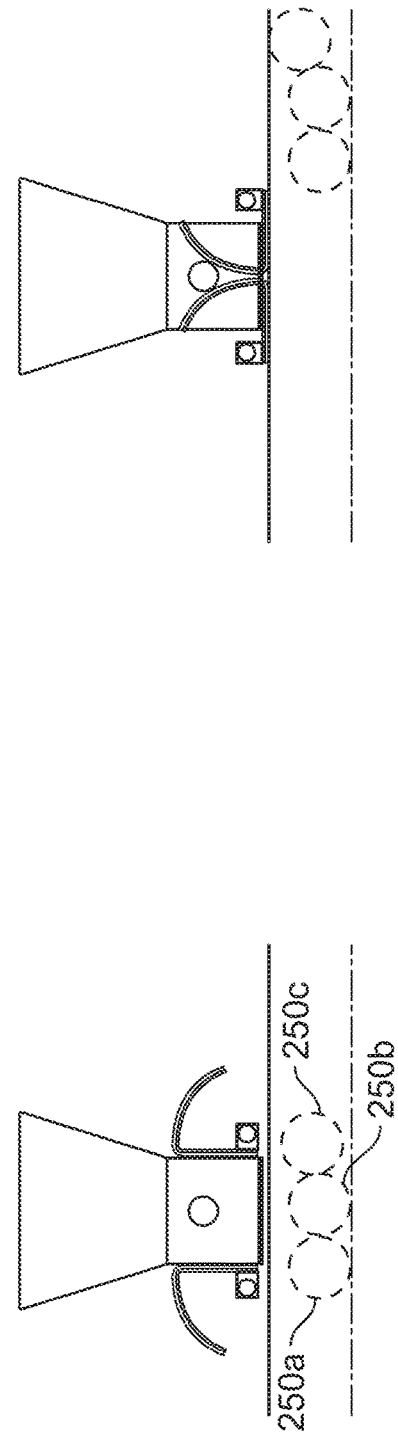

US 11,744,252 B2

SELF-CLEARING DOUGH BALL LOADER

BACKGROUND

Examples of comestible products are flatbreads, which include, for example, tortillas, pita bread, pizza crusts, chapati, and naan. Flatbreads can be made by hand or with automated equipment. For example, a factory can produce one or more types of flatbread. Factories can use partially or fully automated systems to produce flatbread. Automated methods to form flatbread can include, for example, die cutting, sheeting, or pressing of flatbread dough.

Factories can include different types of tools or equipment for the different stages in the production process, such as a mixer, a former (also referred to as a "divider/rounder,") a proofer, a press, and an oven, a cooling conveyor, a quality control/reject system, a counter stacker, an accumulator, and a stack indexer as well as packaging machinery. Some production lines have tools to form flatbread dough into a ball and other tools to flatten the dough for baking. The flattened dough can have a circular shape and a specific thickness so the flatbread will have a desired thickness after baking.

SUMMARY

A system that makes comestible flatbread products, such as tortillas, can include multiple components. This disclosure describes systems and methods for making comestible products that are produced with automatic processing and high-speed systems where some of the comestible products become jammed causing an obstruction in the manufacturing line during production. These systems and methods consider various aspects of detecting, notifying, and self-clearing the jam or obstruction.

Some of these systems detect, notify, and self-clear a jam that arises when one or more comestibles, such as dough balls, are deposited into an opening of a loader. For example, multiple dough balls in the same opening can cause jams in the opening such that the dough balls are not allowed to pass through the loader and onto a conveyor as they would during normal operation. Since a new dough ball is disposed within the opening of the loader frequently, for example, every few seconds (e.g, once every two to six seconds), this can result in a deposit of a dough ball or multiple dough balls. In the case there is more than one dough ball deposited in an opening it is difficult to detect in conventional systems and will cause a problem. Such a buildup (i) causes downtime when detected due to having to stop the production line flow to remove the dough balls from the loader, (ii) has the potential for harm to the operator when they rush to clear it, and (iii) before its detected, waste, can also cause problems down the production line when product is either missing or an incorrect quantity of product is pressed creating waste and inefficiencies. In some implementations, of conventional processing systems, a jamming event or obstruction can be a common occurrence during production leading to lost production time, efficiency, and overall throughput of the production line.

To clear obstructions, an operator might need to halt the production line. Multiple safety interlocks need to be reset resulting in lost time in production. Clearing the obstruction also generates waste material or product, which is costly and inefficient. Once the obstruction is cleared the production line would need to be restarted. The entire process of clearing the obstruction can be very time consuming, which is undesirable in a production line that can otherwise run continuously, i.e., 24/7 operation.

Sometimes the jam, obstruction, or presence of a dough ball in an opening at a time in the process when a dough ball should not be present in the opening can result from dough inconsistency originating from the mixing stage of the production line. Sometimes the dough is extra sticky and the dough balls end up sticking together when exiting a dividing/rounding machine and are deposited into a single cup of a proofer tray of a proofing machine (or "proofer"). Once the dough ball enters the proofer in a proofer cup, it is generally difficult to identify and correct the problem because most proofer cups are inaccessible to an operator once they pass inside the proofer device.

In general, one aspect of the subject matter described in this specification is embodied in systems that includes a comestible processing machine including a loader plate including a plurality of spaced apart openings passing through the loader plate. The comestible processing machine also includes a first flattener and a second flattener pivotably attached to the loader plate at each of the openings. The comestible processing machine also includes a sensor configured to detect a comestible disposed within one or more of the plurality of openings. The comestible processing machine also includes an actuator coupled to the loader plate and configured to assist in removal of the comestible from the one or more of the plurality of openings. Other embodiments of this aspect include corresponding methods, computer systems, apparatus, computer program products, and computer programs recorded on one or more computer storage devices, each configured to perform the actions of the systems.

In general, one aspect of the subject matter described in this specification is embodied in systems that includes a comestible processing machine including a frame. The comestible processing machine also includes a conveyor belt supported on the frame. The comestible processing machine also includes a loader plate movably coupled to the frame and movable relative to the conveyor belt. The comestible processing machine also includes a loading tube aligned over an opening in the loader plate. The comestible processing machine also includes a flattener pivotally attached to the loader plate adjacent to the opening. The comestible processing machine also includes a sensor for detecting a comestible disposed within the opening. The comestible processing machine also includes an actuator coupled to the loader plate and configured to assist in removal of the comestible from within the opening. Other embodiments of this aspect include corresponding methods, computer systems, apparatus, computer program products, and computer programs recorded on one or more computer storage devices, each configured to perform the actions of the systems.

In general, one aspect of the subject matter described in this specification is embodied in methods that include the actions of sensing and removing a comestible from a comestible processing machine, including the steps of: pivoting a pair of opposing flatteners into a closed position. The method also includes transporting the comestible through a tube, onto upper surfaces of the opposing pair of flatteners, with the opposing flatteners in the closed position. The method also includes pivoting the opposing flatteners in mutually opposite directions into an open position, with the comestible supported on the upper surfaces, and thereby creating an opening between the opposing flatteners through which the comestible may pass. The method also includes pivoting the opposing flatteners to return them to the closed position. The method also includes sensing whether a comestible is present in the opening and pivoting the opposing flatteners in mutually opposite directions into the open position. The method also includes removing the comestible from the opening. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Implementations of the described techniques may include hardware, a method or process, or computer software on a computer-accessible medium.

In some implementations, the sensor of the comestible processing machine includes a laser detector configured to detect a laser beam. In some implementations, the sensor of the comestible processing machine includes an image sensing device configured to capture an image of the one or more plurality of openings in the loader plate.

In some implementations, the actuator of the comestible processing machine is configured to move the loader plate to assist in removal of the comestible. In some implementations, the actuator is configured to move the flattener to assist in the removal of the comestible. In some implementations, the actuator is configured to move the loader plate to assist in the removal of the comestible from the opening. In some implementations, the actuator of the comestible processing machine is configured to vibrate the loader plate to assist in removal of the comestible. In some implementations, the actuator of the comestible processing machine is configured to pivot one of the first and second flatteners to assist in removal of the comestible.

In some implementations, the comestible processing machine includes a discharge conveyor configured to discharge the comestible from the comestible processing machine. In some implementations, the comestible processing machine includes a controller configured to stop or suspend one or more components of the comestible processing machine when the sensor detects the comestible disposed within one or more of the plurality of openings.

In some implementations, the method step of sensing the comestible includes one of detecting whether a laser beam is received by a laser beam detector, detecting whether a laser beam is obstructed, detecting the comestible using an image capturing device. In some implementations, the method step of removing the comestible from the opening includes injecting air into the opening.

In some implementations, the method step of removing the comestible from the opening includes actuating a loader plate of the comestible processing machine. In some implementations, the method step of actuating the loader plate includes moving the loader plate. In some implementations, the method step of actuating the loader plate includes vibrating the loader plate.

In some implementations, the method includes discharging the comestible from the comestible processing machine after removing the comestible from the opening. In some implementations, the method includes stopping or suspending a component of the comestible processing machine upon sensing a comestible is present in the opening.

The subject matter described in this specification can be implemented in various ways and may result in one or more of the following advantages.

Non-conforming dough balls can be detected by a sensor or group of sensors associated with the loader so the production line can be stopped, slowed down, or suspended for a period of time before a larger problem is created. This eliminates waste and requires less down-time for the processing machine. In some implementations, select components of the production line are stopped, slowed-down, or suspended, while others continue to run, which increases efficiency.

A self-clearing capability can reduce or even can eliminate the need for operator intervention. For example, if a jam or other non-conforming event (e.g., the presence of a dough ball in an opening of the loader at a time in the process when a dough ball should not be present in the opening) occurs frequently, this allows the operator to perform other job duties and not be primarily concerned with monitoring for a non-conforming event in the process.

A self-clearing capability can reduce or even eliminate a snowball effect where a first jam of dough balls causes a pile-up of dough balls that can damage equipment. Sometimes this equipment requires specially-trained mechanics to be called in for repairs, which increases the downtime of the equipment and the production line. Such snowball jams can occur quickly, sometime within 30 seconds, since the production line systems operate at a frequency of 18-22 cycles per minute. Additionally, there are safety concerns when a group of joined dough balls form into one press mass and is pressed and is fed forward into the oven. This enlarged press mass can be a fire hazard of some formulas in some lines.

During a portion of the manufacturing process, a comestible generally takes the form of a spherical structure. This structure may be referred to as a dough ball. However, the comestible is not limited to a dough composition. For instance, it may be corn, chocolate, or other types of comestibles.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6A illustrates the loader in a closed configuration. FIG. 6B illustrates the loader in an open configuration.

FIGS. 7A-7K illustrate various configurations of the loader during operation.

FIGS. 10A-10E are schematics illustrating a process for removing non-conforming dough balls in an opening of the loader during operation of the comestible processing machine.

Like reference numbers and designations in the various drawings indicate like elements.

DETAILED DESCRIPTION

A comestible processing machine/system that makes various comestible flatbread products, such as tortillas, can include multiple components. Such components include a mixer to create a batter, a forming machine (or "former") to create a dough ball from the batter, a proofing machine (or "proofer") to relax the dough, a loader or loader plate (or frame plate) to dispose the dough balls onto a conveyor, a press to form a flattened comestible, an oven to bake the flattened comestible, and a cooler to reduce the temperature of the baked comestible. The machine also includes a self-clearing system to clear jammed or obstructed comestibles that occur in openings formed in the loader plate. The machine also includes a monitoring station that determines whether a cooled comestible conforms to predetermined criteria, such as roundness and size, e.g., diameter. The machine includes a counter-stacker that creates stacks of comestibles. Once a comestible stack is created, the machine bags the comestible stack, e.g., using a bagger.

Figure 1:
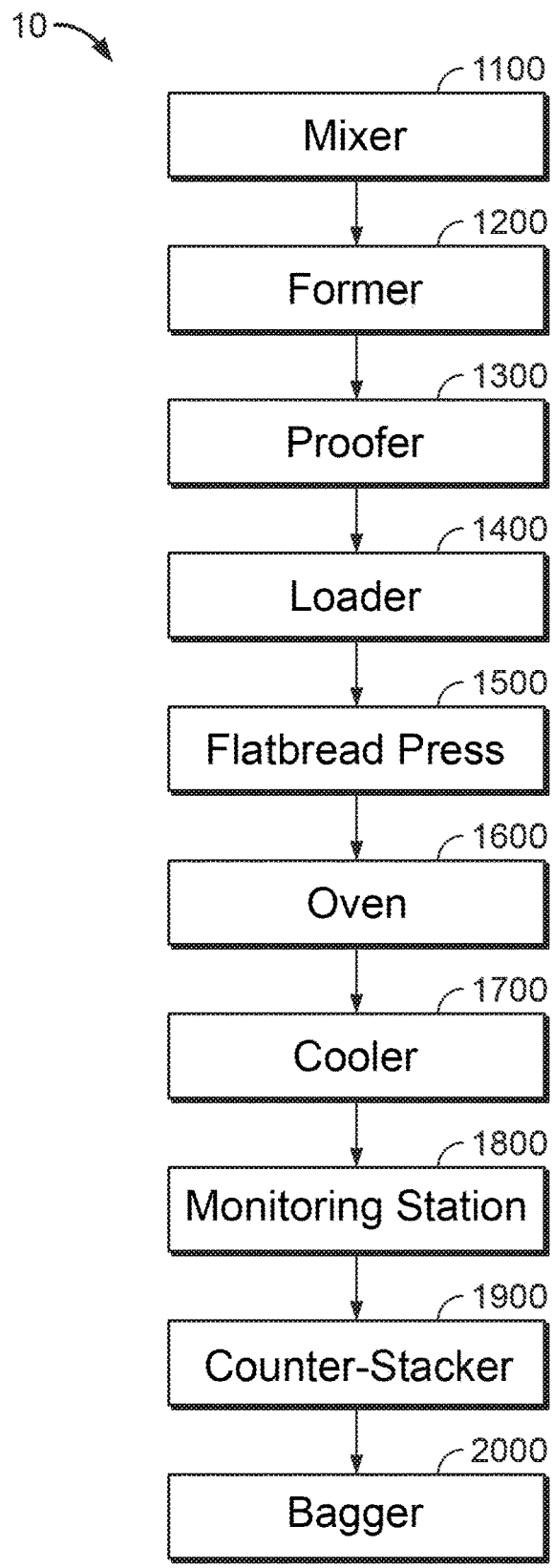
FIG. 1 is a schematic of the components of a comestible processing machine.

FIG. 1 is a schematic of some components that are included in a comestible processing machine 10. The comestible processing machine 10 can be used for making various comestible flatbread products, such as tortillas. The comestible processing machine 10 includes a mixer 1100, a former 1200, a proofer 1300, a loader 1400, a flatbread press 1500, an oven 1600, a cooler 1700, a monitoring station 1800, a counter-stacker 1900, and a bagger 2000. Some comestible processing machines have more components and some comestible processing machines have less components, depending on machine configuration and purpose of the machine.

Figure 2:
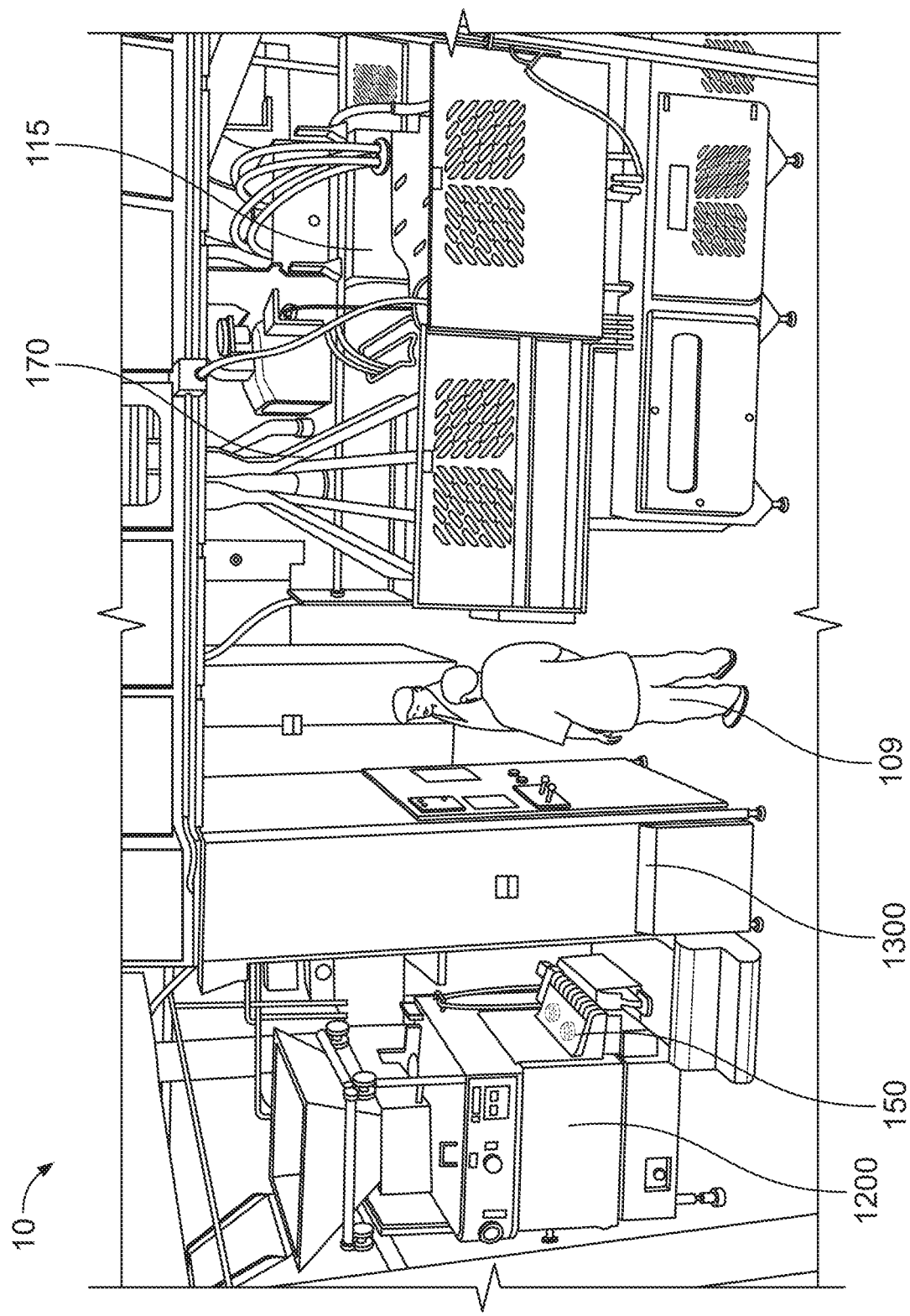
FIG. 2 is a perspective view of components of the comestible processing machine.
Figure 3A:
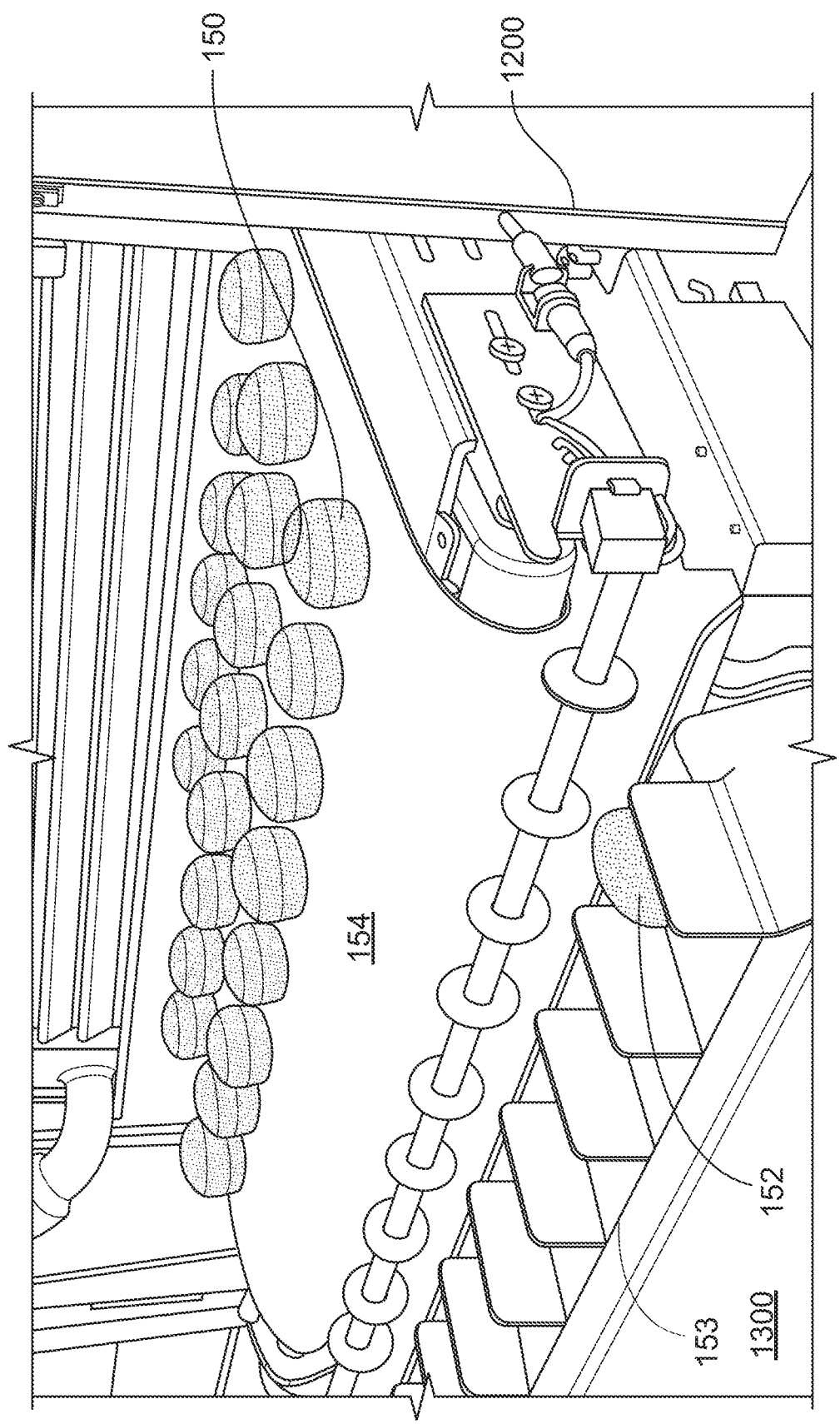
FIG. 3A is a perspective view showing comestibles (e.g., dough balls) exiting a forming machine of the comestible processing machine of FIG. 2 and entering a proofing machine.

FIG. 2 shows various components of the comestible processing machine 10, which are generally monitored by an operator 109. The mixer 1100 (shown schematically in FIG. 1) is used to combine multiple ingredients according to a process recipe to create a dough batter. The mixer 1100 is connected to a former 1200 for forming the dough batter. The former 1200 (also referred to as a divider or a rounder) divides the dough batter to create multiple approximately spherical dough balls 150 (as shown in FIG. 3A). A rotating drum of the former 1200 selects an amount of dough batter based on a desired size for the dough balls 150, e.g., to create 10 inch tortillas or 8 inch tortillas. Sometimes these dough balls 150 can be sticky depending on the ingredients used in the dough batter.

Referring to FIGS. 2 and 3A, the approximately spherical dough balls 150 exit the former 1200 on a conveyor 154. In this example, sequential rows of dough balls 150 exit the former 1200 and drop into a timing gate 153 of the proofer 1300. In FIG. 2, two dough balls 150 are shown side-by-side exiting the former 1200, but any number of dough balls 150 can be arranged in a row. FIG. 3A shows eight dough balls 150 side-by-side exiting the former 1200 and a dough ball 152 being dropped into the timing gate 153 of the proofer.

Figure 4:
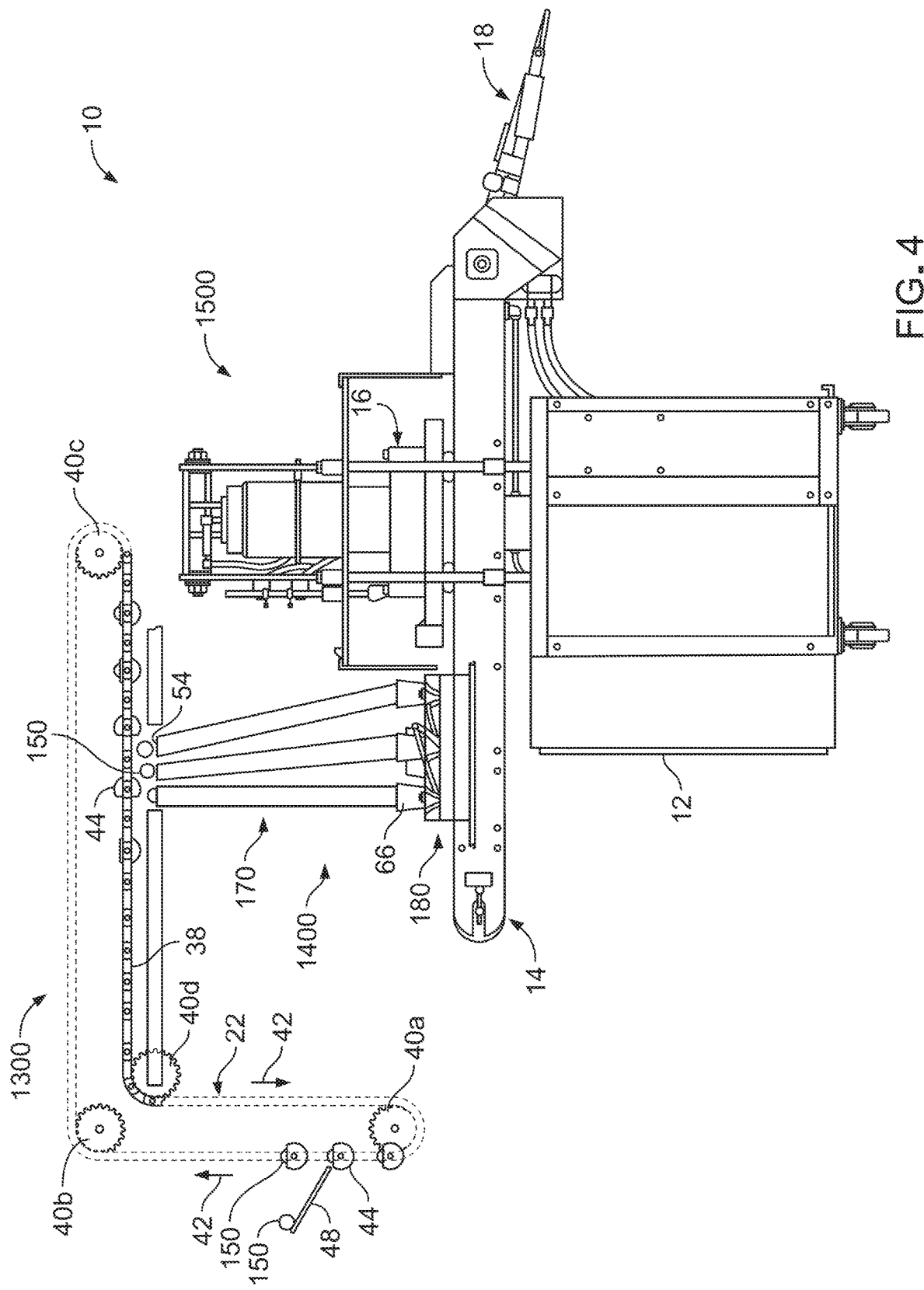
FIG. 4 is a plan view of components of the comestible processing machine of FIG. 2.

Sometimes more than eight dough balls 150 can be formed in a single row and sometimes less than eight dough balls 150 can be formed in a single row, depending on machine configuration. A rotating drum and conveyor of the former 1200 are computer controlled by the comestible processing machine 10 and can be commanded or instructed to slow-down, speed-up, or intermittently stop or suspend motion. For example, a controller, e.g., a data processing and controlling device, of the rotating drum and the conveyor of the former 1200, can command a relaxation conveyor 22 (FIG. 4) to slow down or temporarily stop while an obstruction or jam of dough balls 150 is cleared from a loader 1400 (as shown in FIG. 4). In some cases, components of the comestible processing machine 10 can be stopped, slowed down, or suspended while the obstruction or jam of dough balls 150 is cleared. In some cases the entire operation of the former 1200 can be halted while an obstruction or jam of dough balls 150 is cleared from the loader 1400.

Referring back to FIG. 2, the proofer 1300 allows the dough balls 150 to proof or rest. Sometimes this process is referred to as a proofing step or proving step. While, the majority of tortilla doughs may not contain yeast, the proofer 1300 gives the dough balls 150 time to relax and equalize asymmetric tensions in the elasticity of dough that develop from the forming process of the former 1200. In the case where no yeast is present in the dough, the proofing step equalizes asymmetric tensions from gluten tensions in the dough caused either by the mixing, dividing, or rounding steps.

FIG. 4 illustrates the proofer 1300, loader 1400, and a flatbread press 1500 of the comestible processing machine 10 in further detail. As shown in FIG. 4, the machine 10 includes a frame 12, a conveyor belt 14 on the frame 12, a parbaking press unit 16 and a discharge conveyor 18. The loader 1400 is mounted above the flatbread press 1500 infeed conveyor belt 14. The proofer 1300 and an associated relaxation conveyor 22 is positioned over the loader 1400 and supplies dough balls 150 to the loader 1400. The relaxation conveyor 22 of the proofer 1300 is preferably a flat press belt that carries the dough balls 150 within dough ball cups 44. The relaxation conveyor 22 is sufficiently wide to accommodate the desired number of rows of dough balls 150 (and cooked product) being formed and includes a chain 38 of dough ball cups 44. The chain 38 passes over sprockets 40a-40d, moving the dough ball cups 44 in the direction of the arrow 42. The dough ball cups 44 are pivotably supported on the chain 38. Each of the cups 44 are eccentrically pivoted, and are unloaded by automatically pivoting to dump or drop the dough balls 150 into the transfer tubes or loading tubes 170 and onto the loader 1400 which includes a loader plate 180.

The dough balls 150 are loaded into the relaxation conveyor 22 of the proofer 1300 via a loading chute 48 provided with dough balls 150 from the former 1200 or through the timing gate 153 (as shown in FIG. 3A). The travel time from loading the dough ball 150 at the chute 48 until the dough ball 150 is transported to the loader plate 180 is generally about 5 to 20 minutes, or sufficient time for the dough to relax. The travel time is dependent on machine configuration. The relaxation conveyor 22 on the proofer 1300 is computer controlled by the comestible processing machine 10 and can be commanded to slow down, speed up, or intermittently stop or suspend motion. For example, the controller of the relaxation conveyor 22 can instruct the relaxation conveyor 22 to slow-down or temporarily stop or suspend motion while an obstruction or jam of dough balls 150 is cleared from the loader plate 180.

Figure 5:
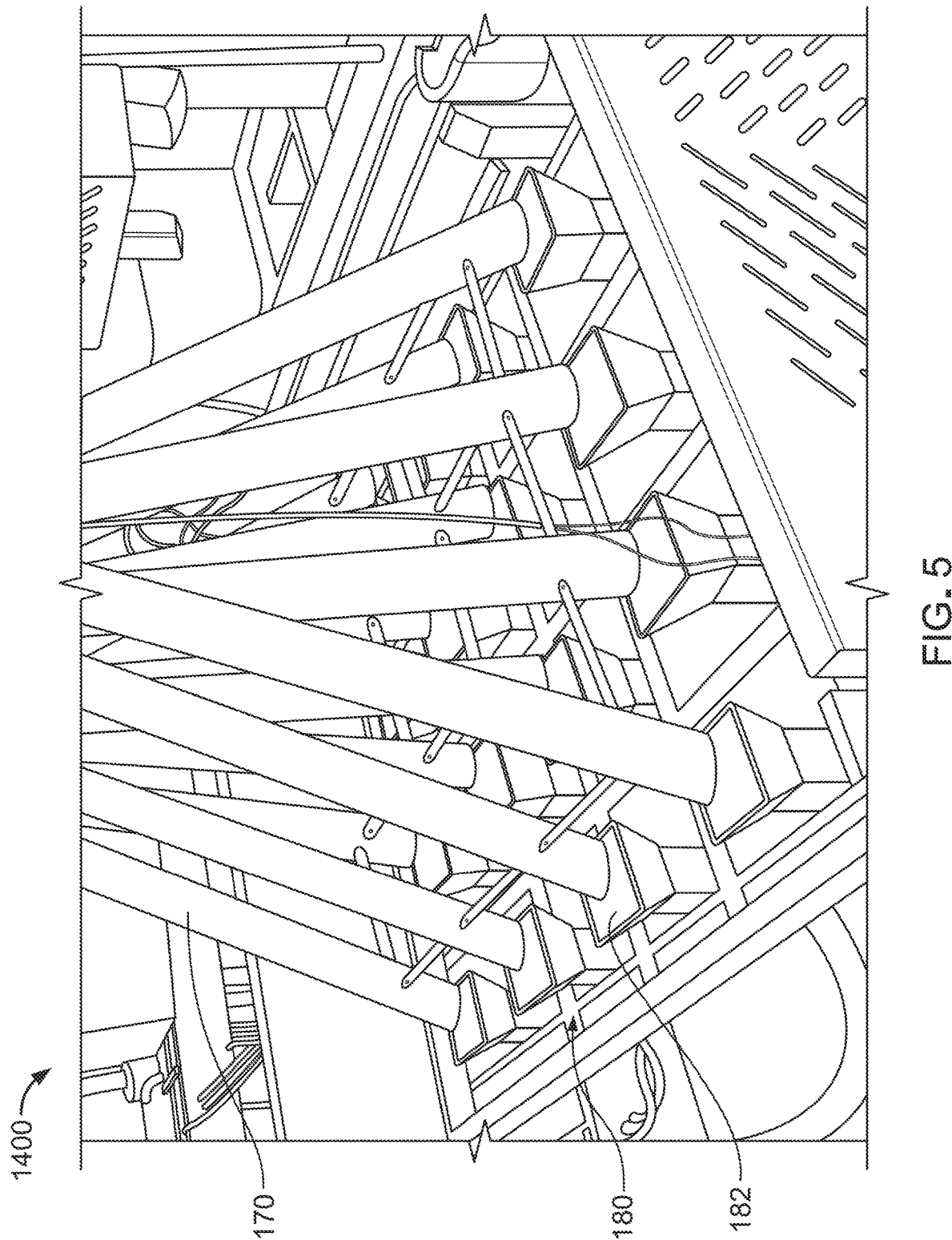
FIG. 5 is a perspective view of a loader and transfer tubes of the comestible processing machine of FIG. 2.

Referring to FIG. 5, the loader plate 180 of the loader 1400 includes sixteen spaced-apart openings 182 arranged in a 4×4 square grid. Each opening 182 is aligned with a respective downtube 170. The transfer tubes 170 are hollow tubes that supply the dough balls 150 from the relaxation conveyor 22 of the proofer 1300 to the openings 182 of the loader plate 180. The transfer tubes 170 each have a top entrance opening 54 and a bottom discharge opening 66, as shown in FIG. 4. Multiple sets of hollow tubes may be provided, depending on machine configuration. For example, as seen in FIG. 5, comestible processing machine 10 is configured with sixteen transfer tubes 170 arranged in a 4×4 rectangular grid.

Figure 3B:
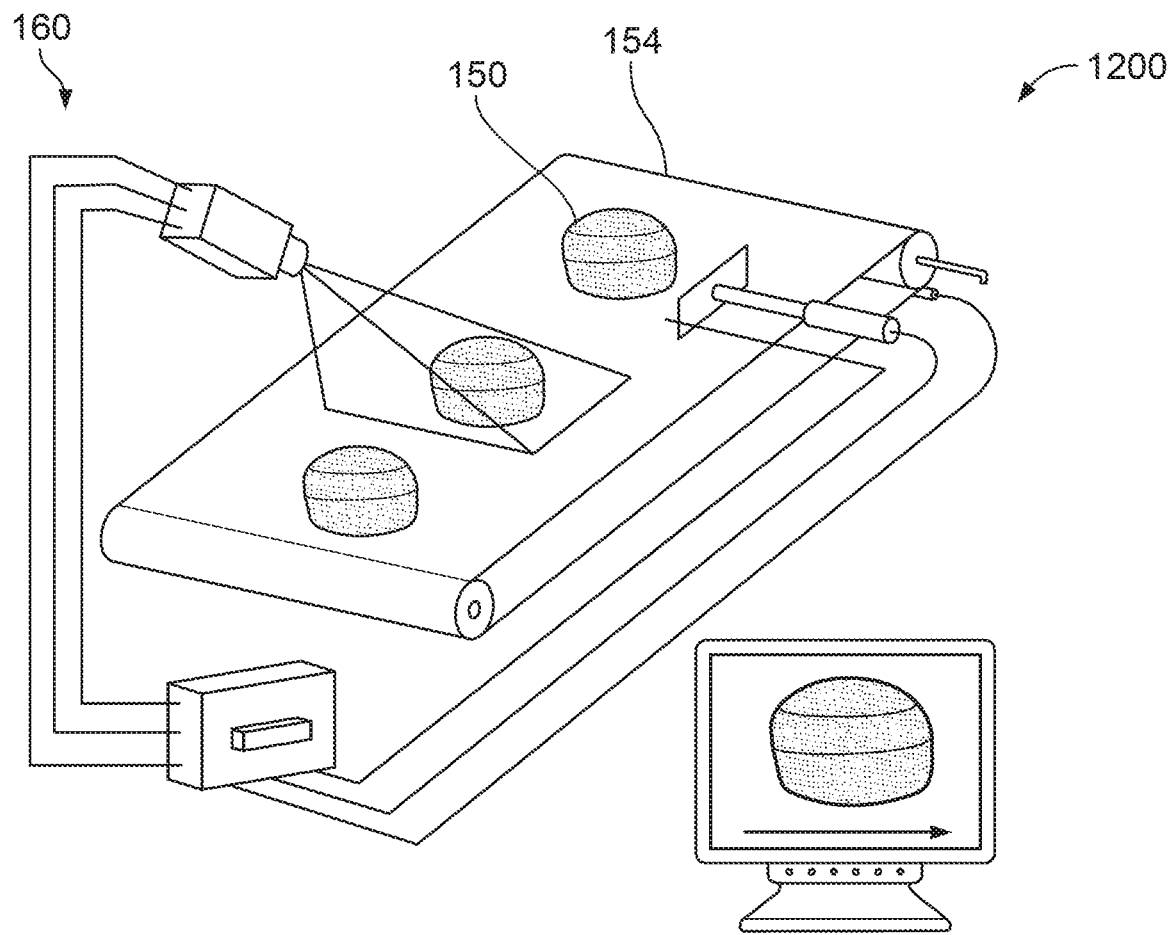
FIG. 3B is an illustration of a comestible sensing system.

FIG. 3B shows a detection device 160, such as a photo-eye, photo detector, imaging-capturing device, or vision device, located at the discharge of the former 1200. The detection device 160 is used to detect the presence, absence, or non-conformity of dough balls 150. The detection device 160 is controlled by a controller of the comestible processing machine 10. The controller causes the detection device 160 to sequentially detect the dough balls 150.

Figure 6A:
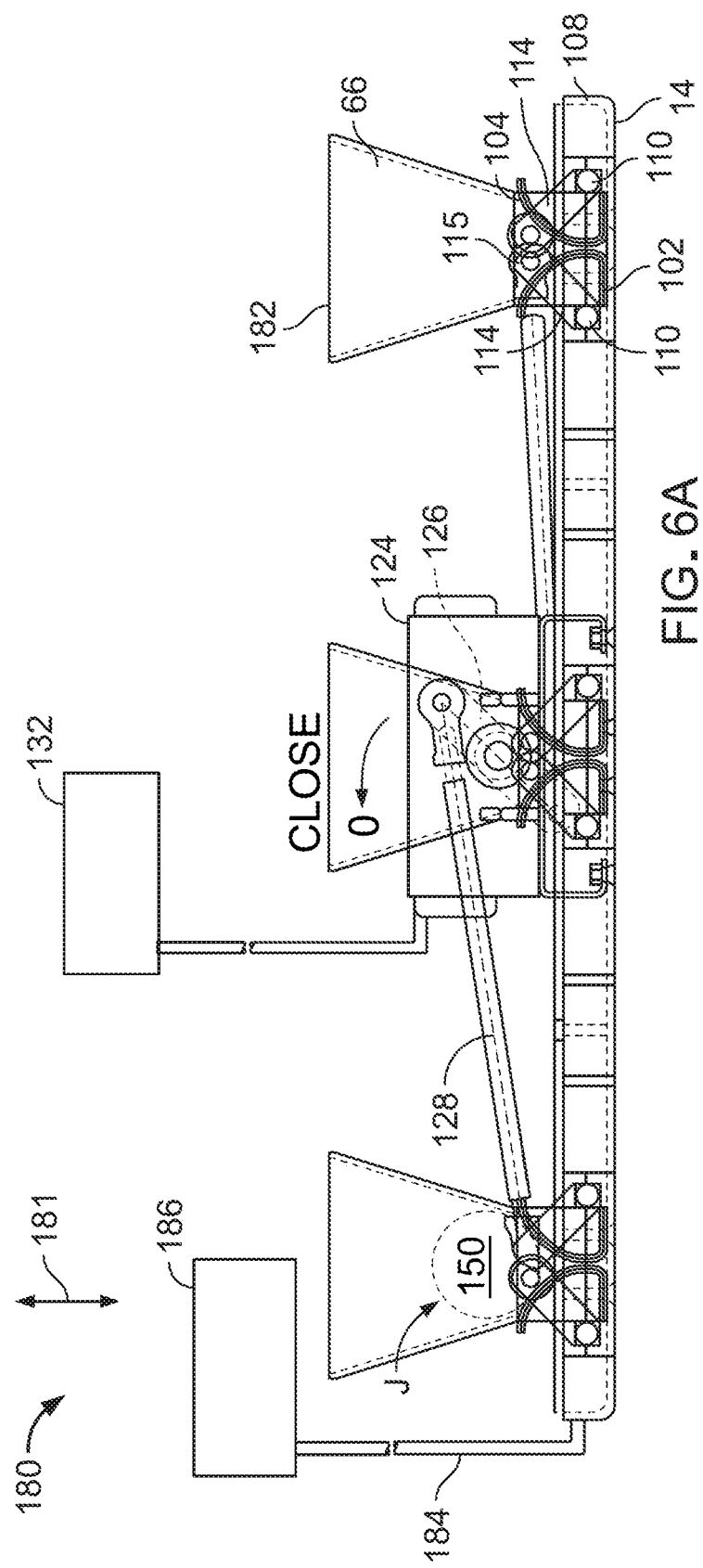
FIGS. 6A and 6B are side-elevation views of a loader.
Figure 6B:
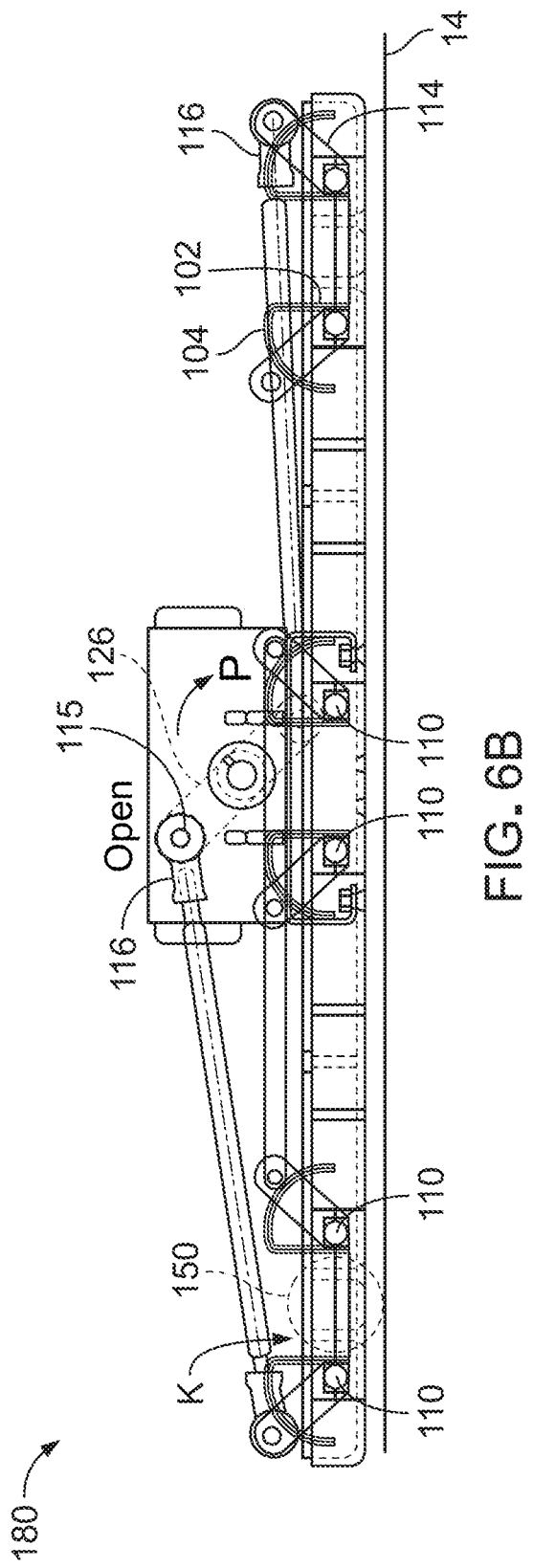
Figure 6C:
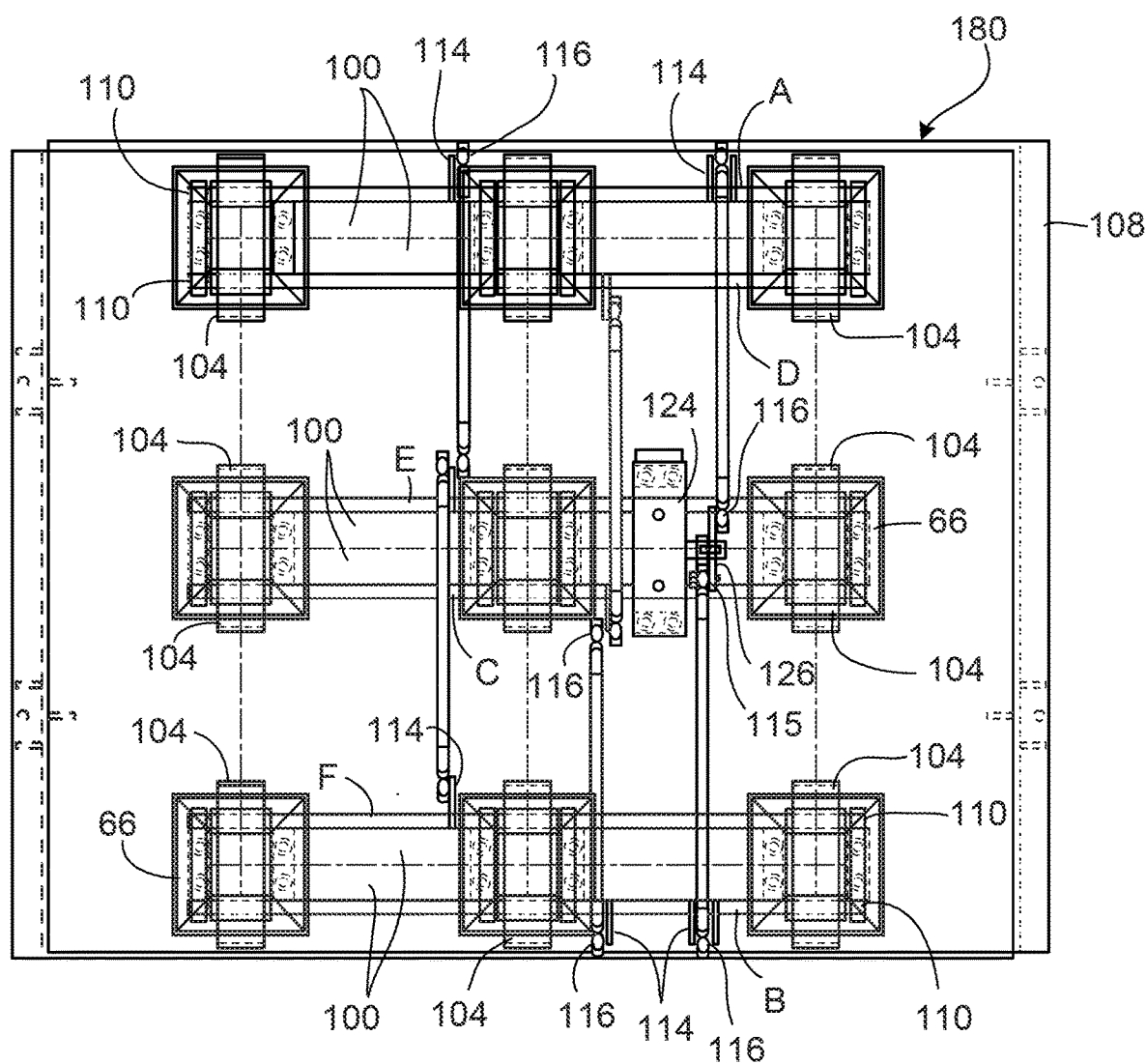
FIG. 6C is a top view of the loader shown in FIGS. 6A and 6B.

FIGS. 6A-6C illustrate the loader plate 180 of loader 1400 shown in FIG. 5 in position above conveyor 14. Loader plate 180 can be fabricated to include various patterns, e.g., 3×3, 4×4, 5×5, 5×3, 6×2.

The loader plate 180 is supported by the frame 12 of the comestible processing machine 10, and can move relative to the frame 12 and the conveyor 14. The loader plate 180 includes multiple spaced apart openings 182 passing through the loader plate 180. In the exemplary implementation shown, the loader plate 180 includes pairs of opposing flatteners 100 disposed at each of the openings 182.

Movement or actuation of the loader plate 180 relative to the frame 12 and/or conveyor 14 is controlled by a controller 186 of the comestible processing machine 10. The controller 186 communicates signals to an actuator 184 disposed on the frame 12 to move the loader plate 180. In some implementations, the actuator 184 is disposed on the loader plate 180. In some implementations, multiple actuators 184 are disposed at one or more of the openings 182.

For example, the actuator 184 can be controlled by the controller 186 to move the loader plate 180 in a vertical direction 181 (e.g., up and down relative to the frame 12 and/or conveyor 14), or in any arbitrary direction, to assist in clearing an obstruction or jam of dough balls from one or more of the openings 182 of the loader plate 180. In some implementations, the loader plate 180 is actuated to vibrate to assist in clearing one or more dough balls from one or more of the openings 182 of the loader plate 180. In some implementations, the loader plate 180 is actuated to contact the loader plate 180 against the conveyor to assist in clearing one or more dough balls from one or more of the openings 182 of the loader plate 180. In some implementations, the loader plate 180 is actuated to temporarily stop or suspend motion while one or more dough balls is cleared from one or more of the openings of loader plate 180.

Each of the pairs of opposing flatteners 100 disposed at each of the openings 182 preferably has a flat bottom surface 102 and a curved upper surface 104. The flatteners 100 are pivotably attached to an end frame 108 of a loader plate 180, on pivot bearings 110. The flatteners 100 are attached to end links 114, which in turn are pivotably attached to rod ends 116 via a pin or bolt 115. An actuator 124 is mounted on top of the loader plate 180 and drives the flatteners 100, periodically causing the flatteners 100 to pivot open and closed, with the sequence and timing synchronized with the conveyor 14. The actuator 124 may be electrically or pneumatically powered and is electrically controlled by a controller 132 of the comestible processing machine 10. The flatteners 100 and loader 1400 are further described in U.S. Pat. No. 6,015,584, the entirety of which is hereby incorporated by reference in its entirety.

Mechanical linkages extend between the actuator 124 and each flattener 100, so that each flattener 100 opens and closes, driven directly or indirectly by the actuator 124. Various equivalent linkages and arrangements may be used for this purpose. The actuator 124 can be controlled by the controller 132 to cause the flatteners 100 to open, close, or partially open when assisting in clearing one or more dough balls from one or more of the openings 182 of the loader plate 180.

The controllers 132, 186 form part of a control system to determine a proper control strategy for the actuation of the loader plate 180 based on a selected dough recipe or pressing pattern. In some cases, a centralized controller controls the controllers 132, 186, and other controllers of the comestible processing machine 10. The centralized controller is one-touch enabled using PLC technology and has the ability to save information related to the control strategy or sensor data in the PLC, or any storage medium. In some cases, this data is queried by the operator 109 or a database.

Figure 7A:
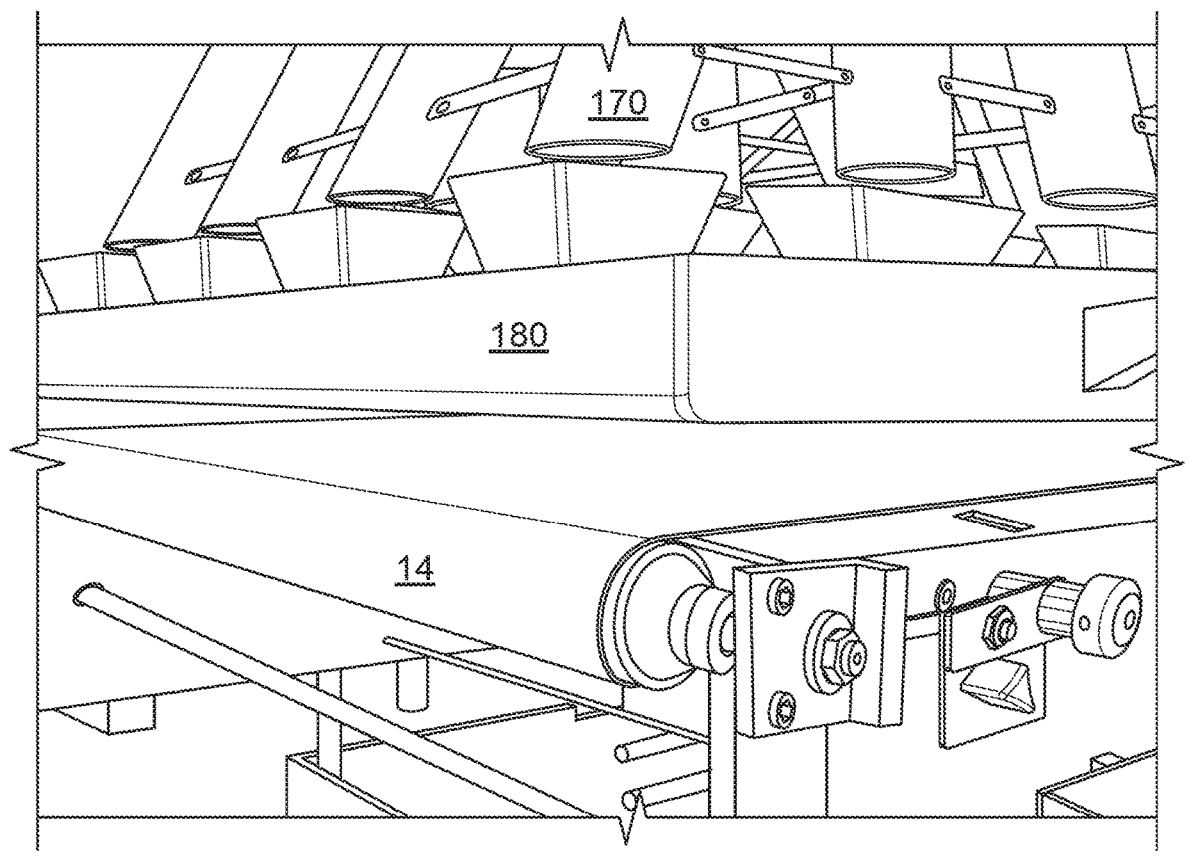
Figure 7B:
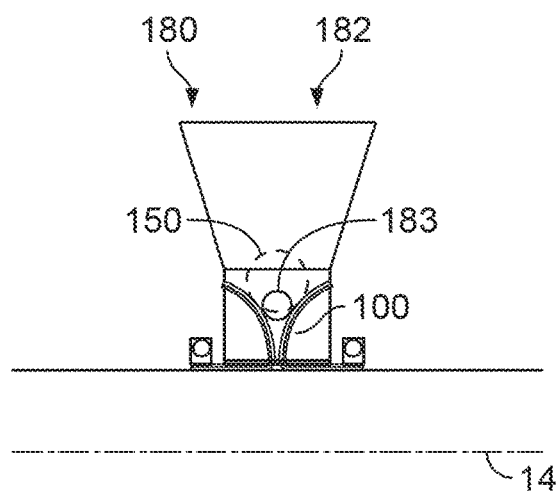
Figure 7F:
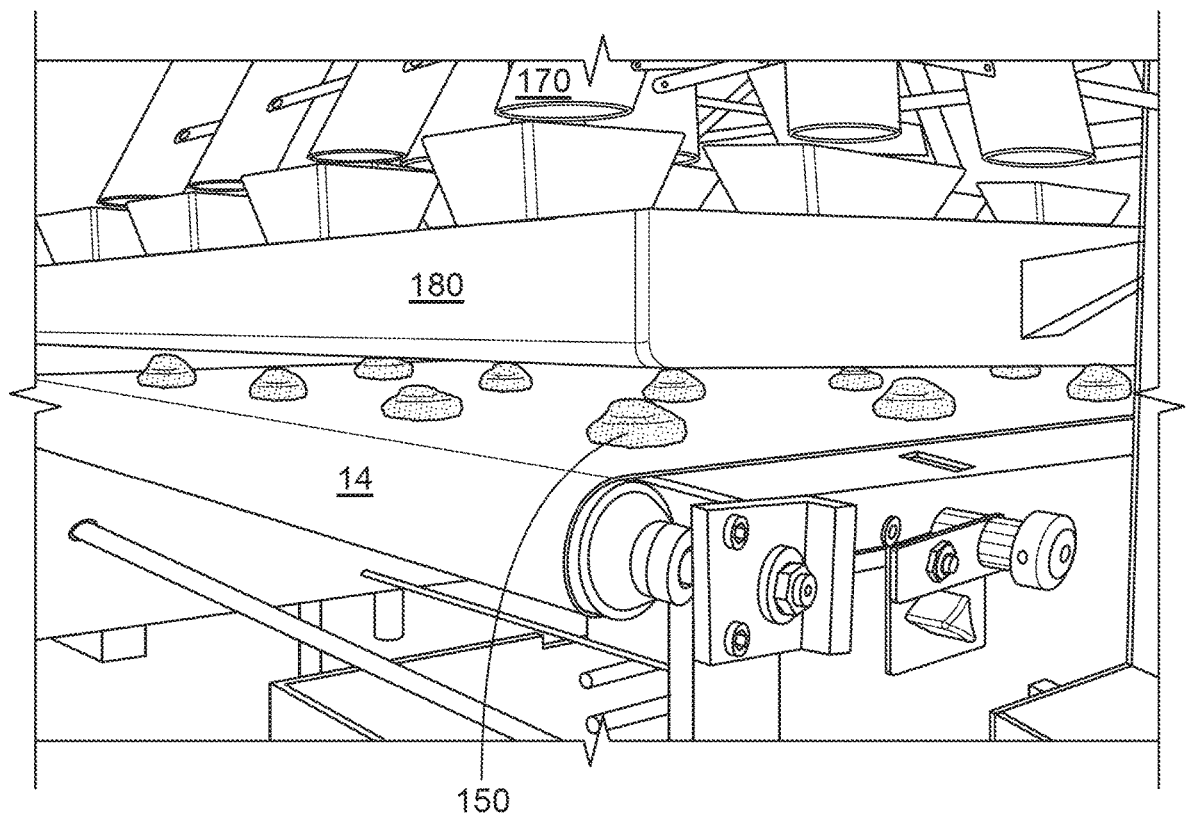
Figure 7G:
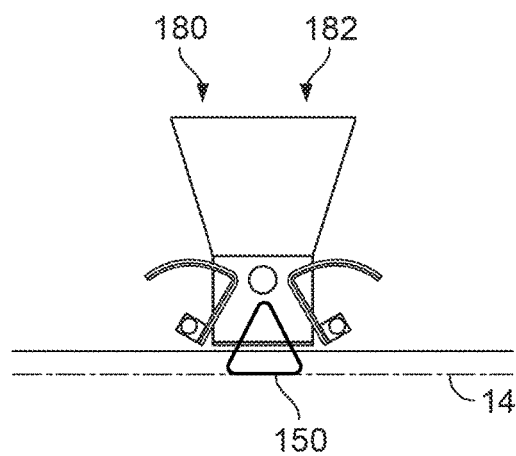
Figure 7H:
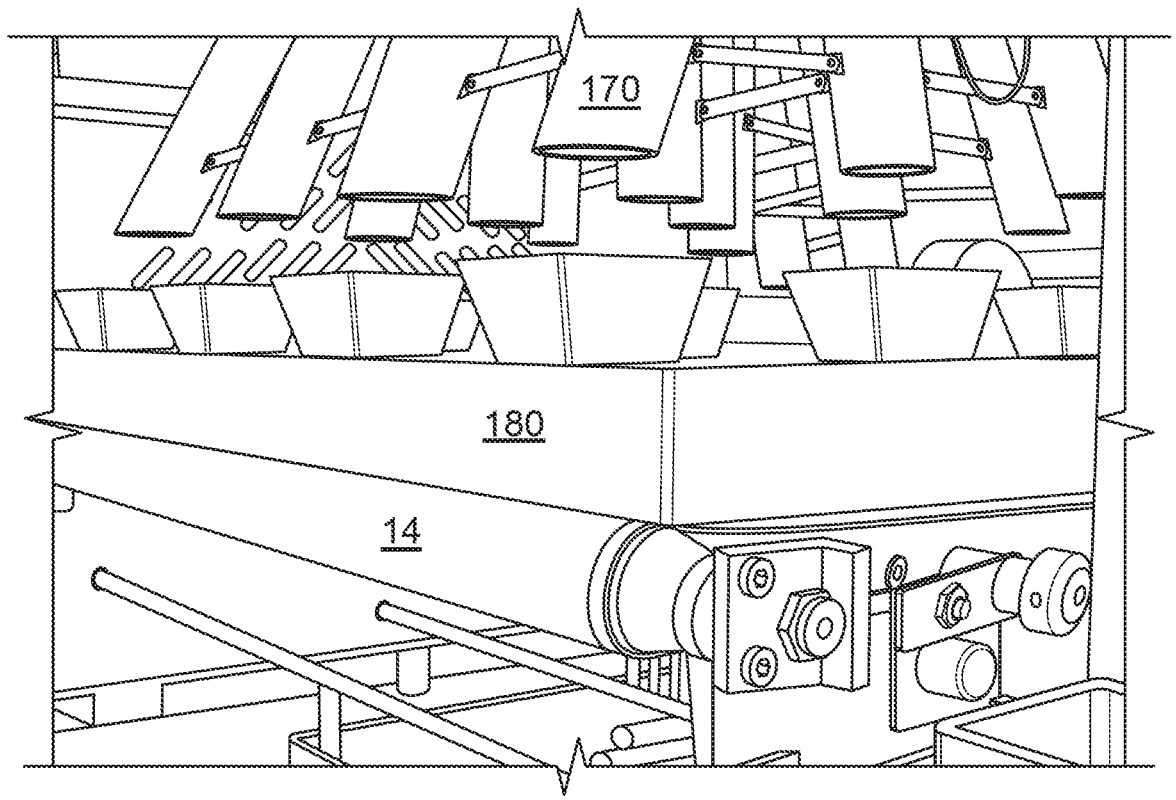
Figure 7I:
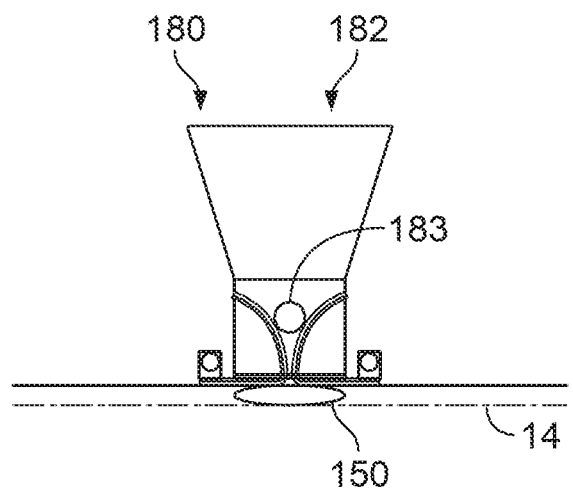
Figure 8:
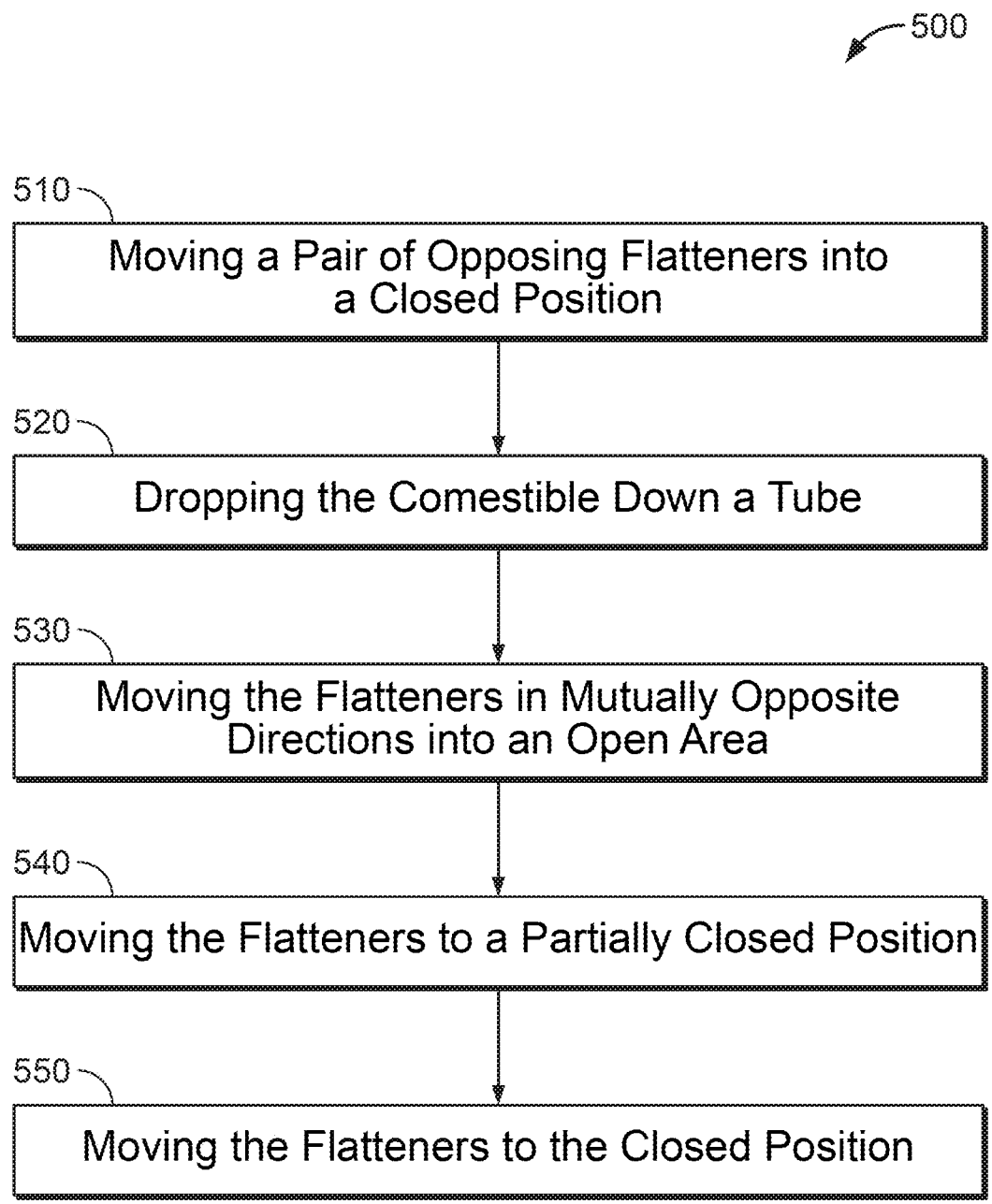
FIG. 8 is a flow diagram of an operation of the loader.

Referring to FIGS. 7A-7K, the process of the loader plate 180 during operation of the comestible processing machine 10 is illustrated and depicted schematically by the process 500 shown in FIG. 8.

In operation, the pair of opposing flatteners 100 are moved into a closed position so that substantially no dough is able to be passed through the openings 182 of the loader plate 180 and onto a conveyor belt 14 (FIG. 8, step 510). Dough balls 150 traverse the proofer 1300 and are loaded into the transfer tubes 170 (FIG. 8, step 520). At this time in the process, the loader plate 180 is in the raised position relative to the conveyor belt 14, as shown in FIG. 7A, and the flatteners 100 are in the closed position, as shown in FIG. 7B. The dough balls drop (or fall) through the transfer tubes 170 and into openings 182 formed in the loader plate come to rest on the curved upper surfaces 104 of the flatteners 100, as shown in phantom in FIG. 7B. In this exemplary implementation, the conveyor belt 14 is stopped. The dough ball 150 can be observed though an aperture 183 formed in the sidewall of a cup, which can take the form of a funnel or other suitable shape, of the loader plate 180. In some cases, the conveyor belt 14 is a reciprocating conveyor.

The actuator 184 lowers the loader plate 180 into the lowered position relative to the conveyor belt 14, as shown in FIG. 7C, with the flattener doors 100 still in the closed position, as shown in FIG. 7D. Actuator 124 pivots the actuator arm 126 in the direction of arrow O in FIG. 6A, causing the flatteners 100 to open, i.e., pivot in mutually opposite directions, into the position shown in FIG. 7E leaving opening 182, in the loader plate 180 (FIG. 8, step 530). In some cases, the process of lowering the loader plate 180 and opening the flattening doors 100 can occur simultaneously.

After the flatteners 100 are sufficiently open, the dough ball 150 may fall from position J shown in FIG. 6A, to position K, shown in FIG. 6B, with the dough ball 150 now resting on the conveyor 14.

The controller 132 then causes the actuator 124 to reverse, driving the actuator arm 126 in the direction P shown in FIG. 6B. This causes the flatteners 100 to partially close as shown in FIG. 7G (FIG. 8, step 540). Partial closing of the flatteners 100 allows the flatteners 100 to form the dough ball 150 from a spherical shape into a substantially triangular or "tam" shape, as shown in FIG. 7G. In particular, the flat bottom surfaces 102 of the flatteners 100 press the dough balls 150 into tam-shaped dough balls 150 onto the conveyor 14. The tam shape prevents the dough ball 150 from rolling around on the conveyor 14 before the next action is taken by the comestible processing machine 10. These tam-shaped, or flattened dough balls 150 are then substantially fixed in position on the conveyor belt 14 limiting the chance that they shift or become displaced during subsequent operations. This also helps to reduces waste. Various shapes, flattening, or pre-pressing that aids in preventing the dough ball 150 from rolling around on the conveyor 14 can be used.

Actuator 184 raises the loader plate 180 into the raised position relative to the conveyor belt 14, as shown in FIG. 7F, leaving the tam-shaped dough balls 150 on conveyor 14.

Flattening doors 100 are once again closed, as shown in FIG. 7I (FIG. 8, step 550). Notably, as shown in FIG. 7I, the dough ball 150 is not observed through the aperture 183 in the sidewall of the cup of the loader plate 180 at this stage. With the flattening doors 100 in the closed position, the loader plate 180 is lowered onto the dough ball 150 causing it to further flatten against the conveyor 14 as shown in FIG. 7H. The further flattened dough ball 150 is now disposed on an upper surface of the conveyor 14 for each of the locations in a pressing pattern, e.g., a 4×4 pressing pattern of loader plate 180 as shown in FIG. 7J.

After flattening, the flatteners 100 are once again opened, with the flat bottom surfaces peeling away from the top surface of the flattened dough ball 150 and then closed again. FIG. 7J shows the dough balls 150 in flattened (or pre-pressed) states on their way to the flatbread press 1500. The dough ball 150 can resemble a hockey puck in this state, e.g., the dough ball 150 may be substantially cylindrical with a finite height.

A controller of the comestible processing machine 10 translates the conveyor 14 forward to move the dough balls 150 under the flatbread press 1500, as shown in FIGS. 7J and 7K. A new dough ball 150 is dropped from the proofer 1300 onto the top curved surfaces of the flatteners 100, as shown in FIG. 7K. The process of the loader plate 180 and flatteners 100 has reset and is repeated for further comestible processing.

The flatbread press 1500 then presses the flattened dough balls 150 into their final, pressed shape. During the pressing operation, the flatbread press 1500 can slightly bake the dough 150 to increase a likelihood that the pressed dough 150 will maintain its final, pressed shape.

The flatbread press 1500 can then transfer the pressed dough 150 to a discharge station included in the flatbread press 1500. The discharge station can include a heater to parbake the pressed dough 150. Use of the discharge station can enable the flatbread press 1500 to use a lower temperature during the pressing process.

Referring to FIG. 1, the comestible processing machine 10 then transfers the pressed dough 150 from the flatbread press 1500 to an oven 1600. The comestible processing machine 10 can use one or more conveyors to transfers the dough 150 from the flatbread press 1500 to the oven 1600.

The oven 1600 includes one or more oven conveyors that transfer the pressed dough 150 through the oven 1600 during a cooking process. As the one or more conveyors transfer the pressed dough 150 through the oven 1600, the pressed dough 150 is cooked so that when the pressed dough 150 exits the oven 1600, the cooking process is complete. In some implementations, the pressed dough 150 proceeds to another cooking process after removal from the oven 1600.

After cooking, the comestible processing machine 10 can transfer the cooked, pressed dough balls 150 onto one or more conveyors to transfer the pressed dough 150 from the oven 1600 to a cooler 1700. In some implementations, the comestible processing machine 10 can use one or more conveyors that transfer the pressed dough 150 to an upper portion of the cooler 1700.

The cooler 1700 can include multiple cooling conveyors that transport the pressed dough 150 through the cooler 1700. The cooler 1700 can use any appropriate process, components, or both, to reduce the temperature of the pressed dough 150. For instance, as the pressed dough 150 moves through the cooler 1700, air can move across the surfaces of the pressed dough 150 to cools the pressed dough to a reduced temperature.

In some examples, the pressed dough 150 can have a temperature close to 200° F. when entering the cooler 1700. The cooler can include one or more fans to move air from an environment outside of the cooler 1700 (e.g., at an ambient temperature between about 65 to about 80° F.) across the cooling conveyors and the pressed dough 150. As the air passes across the pressed dough 150, heat is removed from the pressed dough and the pressed dough is cooled.

The comestible processing machine 10 transfers the pressed dough 150 from the cooler to a monitoring station 1800. The monitoring station 1800 can analyze one or more properties of the pressed dough 150, including the diameter and color. For instance, the monitoring station 1800 can determine whether some pressed dough 150 is burnt, conforms to size requirements for a dough recipe for the pressing pattern, or both.

The monitoring station 1800 can include a dough removal device used to remove dough 150 from the monitoring station that do not conform to predetermined criteria for the dough recipe. For instance, the monitoring station can include one or more air blowers, e.g., one for each processing lane for the pressing pattern, to remove pressed dough 150 that was overcooked, pressed too much, not pressed enough, or a combination of these.

The comestible processing machine 10 transfers the pressed dough 150 that conforms to the predetermined criteria to a counter-stacker 1900. The counter-stacker 1900 creates stacks of pressed dough 150 based on a stack quantity identified in the dough recipe for the comestible processing machine 10.

The comestible processing machine 10 transfers stacks of pressed dough 150 to a bagger 2000 that places each stack into a bag. The bagged stack of pressed dough balls 150 can then be removed from the bagger 2000 and the comestible processing machine 10.

As previously described, one or more comestibles, such as dough balls 150 may become stuck in various locations of the comestible processing machine 10 during the process of making comestibles. In particular, dough balls 150 may become stuck or jammed in one or more openings 182 of the loader plate 180. The jammed or stuck dough balls 150 can then prevent other dough balls 150 from correctly moving through the openings 182 and can cause a backup of dough balls 150 on the surface of, or within, the loader plate 180.

For example, once a dough ball 150 becomes stalled or stuck in one or more openings 182 in the loader plate 180, the proofer 1300 may continue to drop dough balls 150 onto the loader plate 180. An obstruction in the opening 182 can occur when one or more dough balls 150 become jammed or otherwise stuck in the opening 182 thereby resulting in no dough balls 150 being able to pass through the opening 182 onto the conveyor 14. If this occurs, subsequently dropped dough balls 150 onto the loader plate 180 can collide with the jammed dough balls 150 causing obstructions that may result in the need to stop or suspend a portion of or the entire production line.

Sometimes, the inherent stickiness of the dough balls 150 causes the dough balls 150 to adhere to each other when exiting the former 1200 and form into double or triple dough balls. In some cases, these double or triple balls are deposited into a single cup 44 of the proofer 1300 which are then dropped into the transfer tubes 170. From the transfer tubes 170, the double or triple dough balls are deposited into the same opening 182 of the loader plate 180.

A non-conforming dough ball may be characterized by an oversized dough ball formed from two, three, or more dough balls coupled to each other, a misaligned dough ball, a stalled dough ball, a jammed dough ball, a dough ball in a pile of two or more dough balls, or a combination of two or more of these.

A jammed dough ball may be a dough ball that contacts or merges with another dough ball, e.g., a stalled dough ball or another jammed dough ball, or a dough ball that is caught, trapped, stuck, or a combination of two or more of these.

Topological characteristics, such as a dough ball that has a wrinkle, fold, a crease, or a shape different from a sphere can be considered non-conforming. In some cases, an undersized, overweight, or underweight dough ball is non-conforming.

Referring to FIG. 3B, in some implementations, the detection device 160, located at the discharge of the former 1200 is used to detect non-conforming dough balls. The detection device 160 is controlled by a controller of the comestible processing machine 10. The controller causes the detection device to sequentially detect the dough balls and, upon detecting the presence of a non-conforming dough ball, the controller can trigger an alarm denoting a jam or issue at a certain position in the production line. The alarm may be audible, visual, or haptic. For example, a red spinning alarm or siren can be activated when a non-conforming dough ball is sensed. In some cases, a speaker or announcement can be broadcast indicating the sensing of a non-conforming dough ball. In some implementations, the production line or a portion of the production line may be stopped or suspended upon detection of a non-conforming dough ball.

The controller can be configured to slow-down or temporarily stop or suspend the former 1200 in response to sensing the non-confirming dough ball. In some cases, the controller can be configured to slow-down or temporarily stop or suspend any component of the comestible processing machine 10 at any time.

The loader plate can also include sensors to detect non-conforming dough balls in addition to, or alternatively from, the former 1200.

Figure 9A:
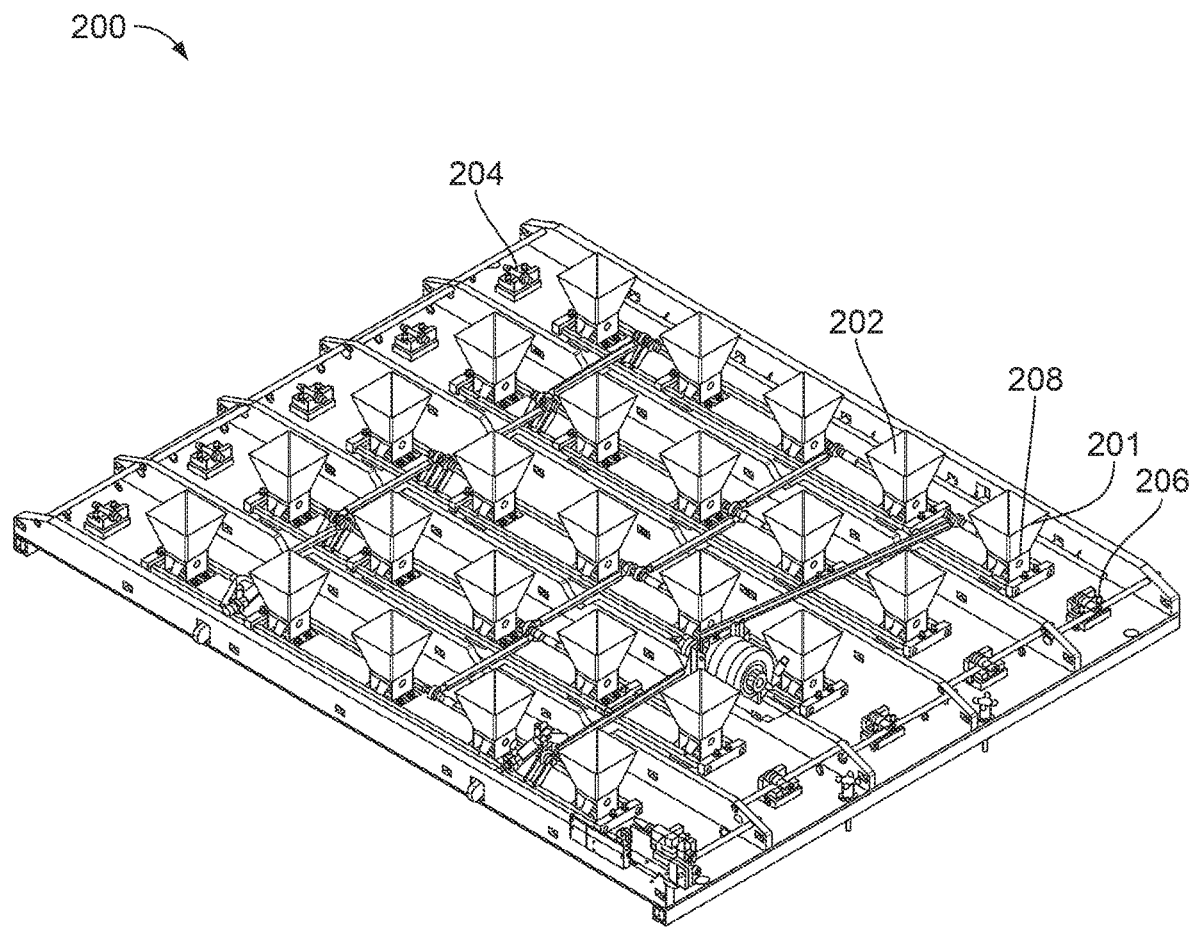
FIG. 9A is a perspective view of a loader with sensors.
Figure 9B:
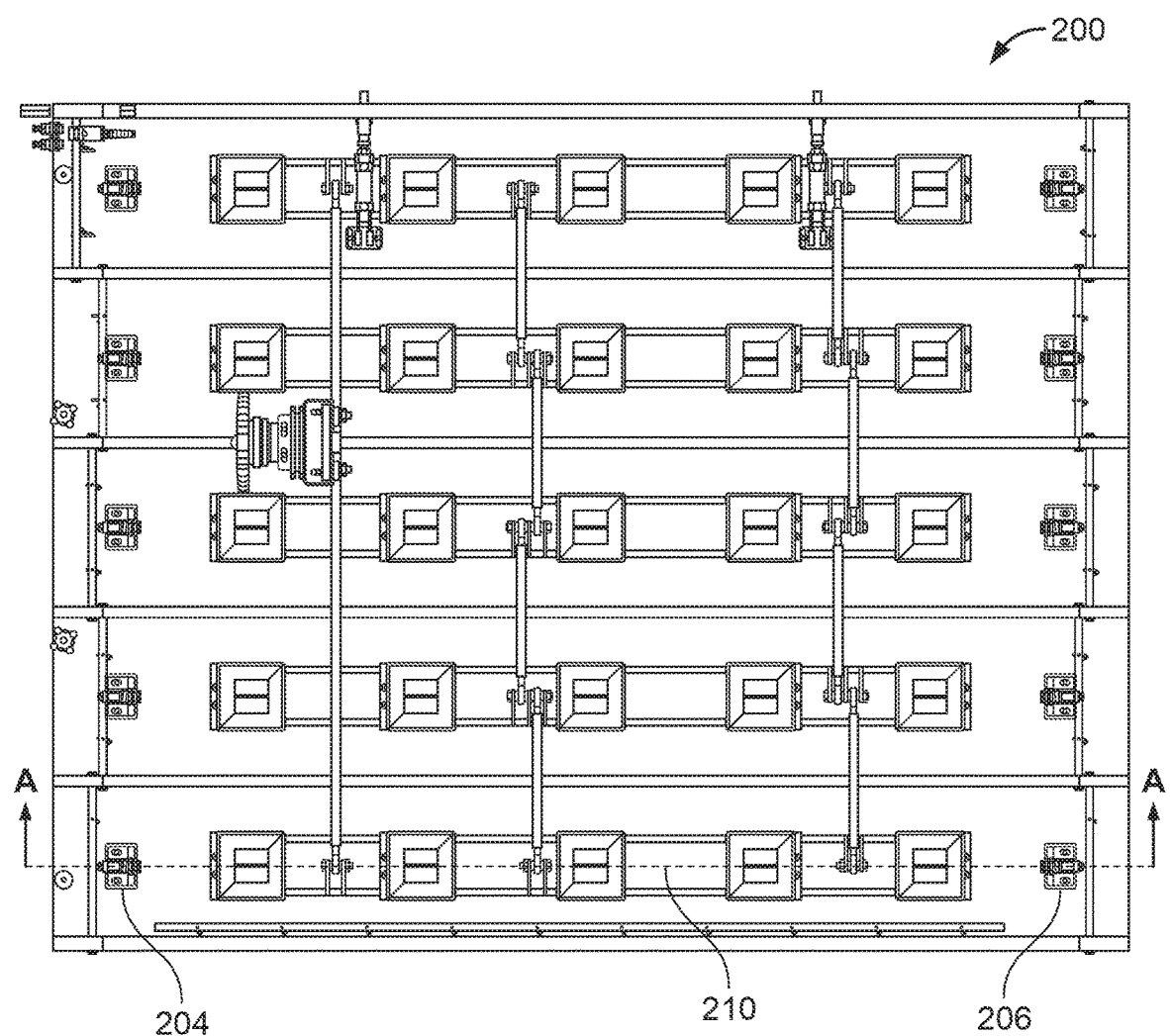
FIG. 9B is a top view of the loader of FIG. 9A.
Figure 9C:
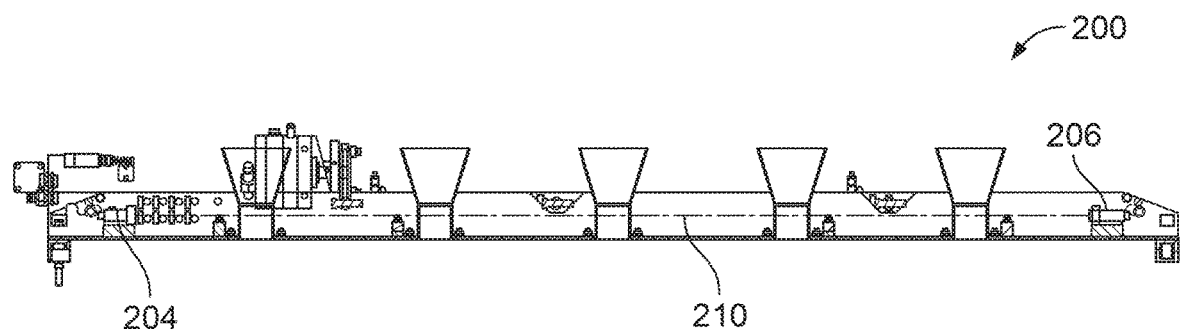
FIG. 9C is a side cross-section view of section A-A of the loader plate of FIGS. 9A-9B.

FIGS. 9A-9C illustrate a loader plate 200 that is substantially similar to loader plate 180 but is configured in a 5×5 pressing pattern and includes five sensors 204, 206 for sensing the presence of one or more dough balls in each of the openings 202. Some implementations of the loader plate 200 can include any configuration of pressing pattern and number of sensors depending on the desired number of comestibles to be processed by the comestible processing machine 10. In an exemplary implementation, sensors 204, 206 can include a five laser emitters 204 and five laser detectors 206 for sensing the presence or absence of one or more dough balls along respective rows of the loader plate 200.

The loader plate 200 includes a number of spaced apart openings 202 passing through the loader plate 200 that each include a pair of opposing flatteners 230. Each opposing pair of flatteners 230 includes a first flattener and a second flattener. Some implementations of the loader plate 200 can include any configuration of openings 202 depending on the desired number of comestibles to be processed by the comestible processing machine 10. In an exemplary implementation, twenty-five openings 202 are arranged in a 5×5 grid on the loader plate 200.

In an exemplary implementation, the operation of the flatteners 230 is substantially the same as the flatteners 100 of loader plate 180. In an exemplary implementation, the flatteners 230 are configured to pivot about an axis from an open position to a closed position.

The loader plate 200 is coupled to one or more actuators, each actuator similar to actuator 184 as described above with respect to FIGS. 6A, that enable translation and rotation of the loader plate 200. For example, the loader plate 200 can couple with two actuators, one disposed on either side of the loader plate 200 and separated from each other along a latitudinal axis.

Laser emitters 204 are attached to the loader plate 200 and are aligned with apertures 208 formed in sidewalls of cups or funnels 201 of the loader plate 200. Each cup 201 includes two apertures 208 opposite from each other such that a single laser beam can pass through the apertures 208 formed in cup 201. The apertures 208 are shown as circular cutouts but other shapes, such as square, rectangular, trapezoidal, or other suitable shapes can be used. In some cases, more than two apertures can be included in each cup 201 so that more than one laser beam can pass through the apertures. In some cases, multiple apertures can be arranged vertically or horizontally relative to each other, or staggered from each other, such that a position of a dough ball 150 or multiple dough balls 150 within an opening of the cup 201 can be determined.

In operation, a controller causes the laser emitter 204 to emit a laser beam 210 (as seen in FIG. 9B or 9C) that passes through each aperture 208 of the cups 201. In the exemplary implementation, the laser beam 210 proceeds along an entire row of cups 201 and is sensed by the laser detector 206 on the opposite side of the loader plate 200. The controller is used to detect the presence of one or more dough balls 150 inside the opening 202 of the loader plate 200 by detecting when the laser beam 210 is blocked and is not received by the laser detector 206. A blockage within the opening 202 indicates that one or more dough balls 150 may be present in the opening 202.

The laser emitter 204, laser detector 206, and controller for controlling the laser emitter 204 and laser detector 206 define a sensor system or sensing system 220. The sensor system 220 communicates with the controller of the comestible processing machine 10. For example, the sensor system 220 can detect that at least one of the openings 202, for example, along a row of openings 202, has jammed when the laser beam 210 that passes through that particular row of cups 201 is blocked and should not otherwise be blocked. The sensor system 220 can send this information to a controller of the comestible processing machine 10 to cause components of the machine to stop, suspend motion, or slow-down. For example, the proofer 1300 or the former 1200 can be instructed to stop, suspend motion, or slow-down so that subsequent dough balls 150 do not drop onto the loader plate 200 when one or more dough balls has been detected. In another example, the controller can command the flatbread press 1500 not to press on dough balls 150 after the jam has been cleared so that the non-conforming dough balls can be removed from the comestible processing machine 10. In another example, the controller can command the flatbread press 1500 to partially press on dough balls 150 after the jam has been cleared so that the non-conforming dough balls can marked and sorted by comestible processing machine 10.

The sensor system 220 can use data from the same or different sensors to detect the presence of a dough ball 150, count dough balls 150 in one or more openings 202, and/or detect non-conforming dough balls. In some implementations, the sensor system 220 can resemble the detection device 160 shown in FIG. 3B. In operation, when the sensor system 220 detects a dough ball 150 that is present but should not be, a self-clearing process is triggered and initiated by a controller of the comestible processing machine 10.

The sensors can be lasers as previously described, or may be one or more image-capturing devices or optical sensors, e.g., infrared, cameras, video cameras, mechanical sensors, or a combination of two or more of these. In some cases, the sensors can be a photo-eye sensor, for example a photoelectric photo-eye sensor that transmits and receives infrared to detect the location, presence, or absence of a dough balls disposed on a plane of the loader plate 200.

In some cases, the sensors can be motion sensors. The sensors may be in the loader plate 200, e.g., near the cups 201 or openings 202. The sensors can be configured to detect the presence of one or more dough balls in all, a portion of, or a select number of the openings 202 in the loader plate 200. In some implementations, the sensor system 220 has a configurable number of sensors. The sensor system 220 can be detachably coupled to the loader plate 200.

In some implementations, the sensor system 220 includes one or more cameras or image-capturing devices that capture images of each openings 202. The images can be processed to detect the presence of one or more dough balls 150, a dough ball 150 count, and non-conforming dough balls. In some examples, the loader plate 200 can include both an infrared sensor and a camera. The loader plate 200 can use infrared sensor data to count dough balls 150 in an opening and camera data from a camera to detect non-conforming dough balls. In some cases, the controller could assemble or stitch together a series of images using image processing. In some cases, the camera is a video camera, such as a Gigabit Ethernet (GigE Vision®) camera. In some cases, the camera is a line scan camera. In some cases, the camera is planar eyes that scan a plane. In some cases, the camera is a 3D camera. In some cases, the camera can use Artificial Intelligence.

In some implementations, the sensor system 220 can use a sensor that captures data of an area spanning the entire loader plate 200 to detect the presence or absence of one or more dough balls 150. The sensor system 220 can alternatively use a sensor that captures data for a single opening or an entire row of openings on the loader plate 200 to detect the presence or absence of one or more dough balls 150.

The sensor system 220 can use artificial intelligence to analyze data received by the sensors to determine whether one or more dough balls 150 is present or non-conforming. For instance, the sensor system 220 can use machine learning to determine whether a dough ball 150 depicted in an image, captured by the sensor system 220, is non-conforming. The sensor system 220 can have a continuous learning process that updates itself based on predictions of a presence of a dough ball compared to an actual presence of a dough ball 150. The sensor system 220 can have a continuous learning process that updates itself based on predictions of a quantity of dough balls compared to an actual quantity of a dough balls 150.

Analysis of data from the sensor system 220 can be performed locally, e.g., by a controller on the loader plate 200 or on the comestible processing machine 10. Analysis of data from the sensor system 220 can be performed remotely, e.g., by a device connected to the sensor system 220 using a network. For instance, a server located in a different physical room from the comestible processing machine 10 can analyze data generated by the sensor system. In some cases, analysis of data can be performed in the cloud or on a remote computing server.

In some implementations, each cup 201 of loader plate 200 can further include separate translational and rotational actuators such that movement of each of the cups 201 can be controlled independently. For example, translational movement of the loader plate 200 can be controlled as depicted for loader plate 180 in FIGS. 7A-7K in addition to additional translational and rotational degrees of freedom for each cup 201 on the loader plate 200. When the sensing system 220 detects the presence of a dough ball 150 indicating a jammed or non-conforming dough ball 250 is present within a particular opening 202 of the loader plate 200, the particular cup 201 is controlled by the actuators to translate, rotate, or vibrate, to assist in removal of the dough ball 150 from the opening 202.

Loader plate 200 is constructed from aluminum, but other materials such as plastic or stain-less steel can be used. Because the loader plate 200 is actuated to move frequently, sometimes 40-100 times a minute, weight and energy consumption of the actuators is important. Actuators can be servo-pneumatic, servo-hydraulic, or servo-electric. Actuators can be bang-bang controlled (i.e., the actuator is commanded to traverse from one limit of travel to the opposite limit of travel without stopping in the center) or the actuator can support variable positioning for increased control. For example, the actuator can use bang-bang air cylinders that have one dimensional stroke length when actuated. Servo devices can be more accurate than bang-bang actuators since they include mid stroke stop positions to enhance positive positioning of differing size dough balls. This allows different recipes to use the same loader although the recipe control is different. Sensors can be used to detect the position of the loader plate 200 and this information can be used by the controller to control the actuators.

When the controller of the sensing system 220 determines one or more dough balls 150 is present within an opening 202, the controller can determine if a dough ball 150 should be present based on the current sequence of the loader plate 200 (e.g., the sequence depicted for loader plate 180 in FIGS. 7A-7K). If the controller determines that a dough ball 150 is expected to be present, no action is needed. If the controller determines that a dough ball 150 is not expected to be present within an opening 202, the controller can initiate a self-clearing process of the dough ball 150 from one or more of the openings of the loader plate 200.

In some cases, the controller can sense the absence of a dough ball 150 within the opening 202 of the loader plate 200 by determining if a dough ball 150 should be present based on the current sequence of the loader plate 200. If the controller determines that a dough ball 150 is not expected, no action is needed. If the controller determines that a dough ball 150 is expected but not present within an opening 202, the controller can initiate a smart shutdown process of the comestible processing machine 10.

For example, dough balls are expected to be dropped from the proofer 1300 through the transfer tubes 170 every several seconds. The dough balls may not arrive at the same time because the length and paths of each individual tube of the transfer tubes 170 can vary. However, the controller can control the comestible processing machine 10 to proceed with the current sequence (e.g., the sequence depicted for loader plate 180 in FIGS. 7A—as planned. During the process of pre-pressing the dough balls 150 onto the conveyor belt 14, the dough balls 150 are expected to drop from the openings 202 onto the conveyor belt 14. The dough balls 150 are no longer expected in the openings 202 at this point in the sequence. The controller can perform a scan and sense whether or not at least one dough ball 150 is still present along each respective row of the loader plate 200. If the controller determines that at least one dough ball is still present, it can instruct the comestible processing machine 10 to perform a clearing process to assist in removing the dough balls.

The clearing process can also separate the non-conforming dough balls 250 from the conforming dough balls 150, which can reduce waste. The process of sensing dough balls 150 occurs quickly so that the next batch of dough balls 150 that are being dropped from the proofer 1300 do not get dropped into openings 202 with dough balls 150 present. As previously mentioned, a dough ball 150 that is detected to be present but should not be is considered a non-conforming dough ball 250. Such a build-up of non-conforming dough balls 250 makes the problem worse and can cause a "snowball" effect of non-conforming dough balls 250.

A smart shutdown process includes halting components upstream of the loader plate 200, e.g., the proofer 1300 and the former 1200, but allowing components downstream of the loader plate 200, e.g., the oven 1600 and the cooler 1700, to continue to operate.

In some implementations, the controller of the sensing system 220 determines if one or more dough balls 150 are present in an opening by determining if a dough ball 150 should not be present based on the current sequence of the loader plate 200. In some implementations, the controller of the sensing system 220 determines a quantity of dough balls 150 within an opening 202. The controller can determine if a dough ball 150 is present but should not be, or a quantity of dough balls 150 exceeds a threshold, which is typically one dough ball. If the controller determines that a dough ball is not present, or the quantity threshold is not exceeded, no action is needed. If the controller determines that a dough ball is present when it should not be, or the quantity threshold is exceeded, the controller can initiate a self-clearing process of the loader plate 200.

For example, when a dough ball 150 is sensed to be present, but otherwise should not be present, the controller can send a signal to an actuator, to cause the loader plate 200 to move and assist in removal of the dough ball 150 from the opening in the loader plate 200.

Figure 11:
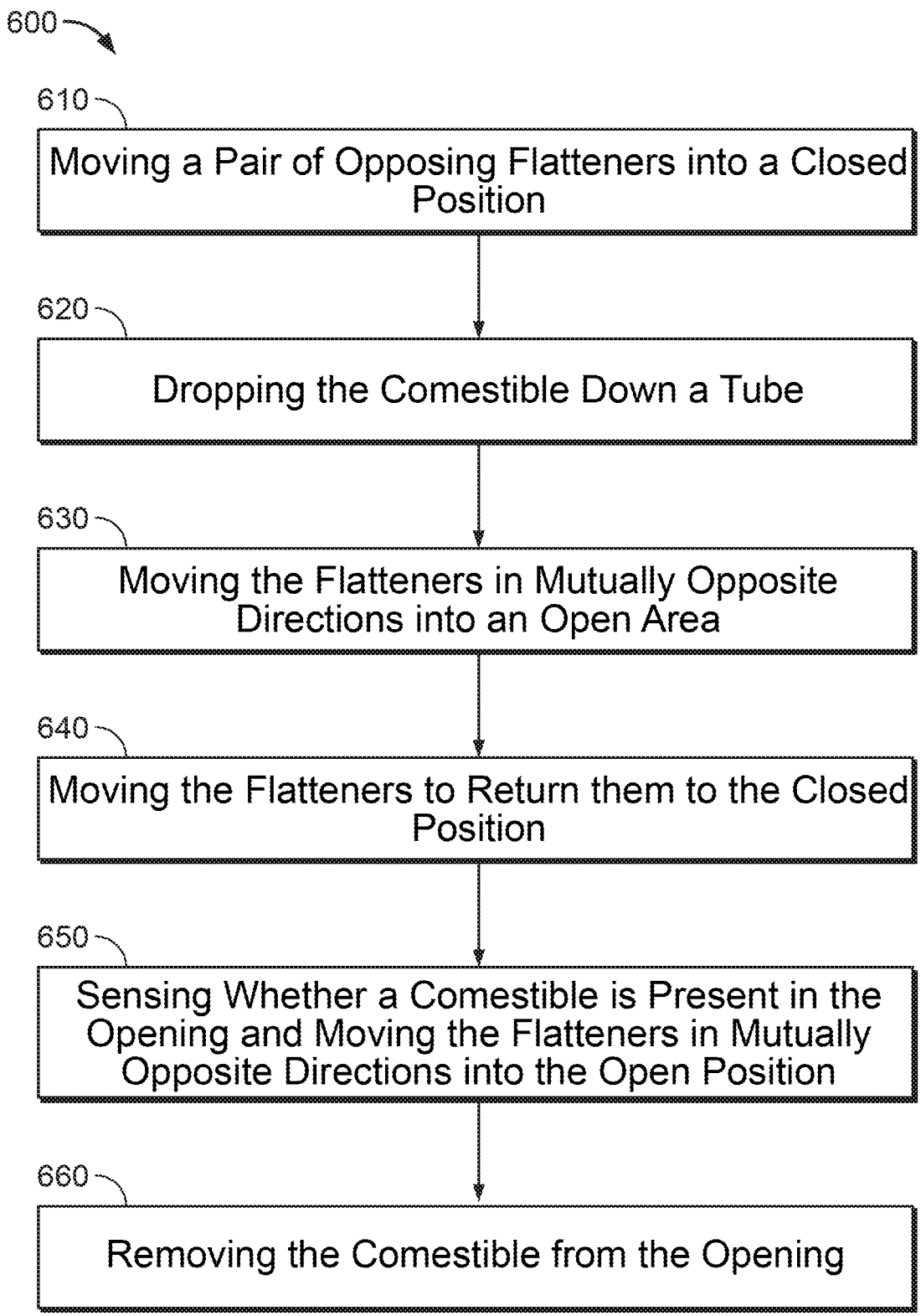
FIG. 11 is a flow diagram illustrating an operation for a loader with sensors for detecting comestibles in one or more openings of the loader.

FIGS. 10A-10E depict the process of the loader plate 200 during operation of the comestible processing machine 10 in conjunction with the sensing system and is represented by the process 600 shown in FIG. 11.

As shown in FIG. 10A, each pair of opposing flatteners 230 are moved into a closed position so that substantially no dough is able to be passed through the opening 202 of the loader plate 200 and onto the conveyor belt 14 (step 610). In this case, dough balls 250a, 250b, 250c are disposed in a single cup 44 of the proofer 1300 and are dropped into the transfer tubes 170 (FIG. 11, step 620). The loader plate 200 is in the raised position relative to conveyor belt 14, as shown in FIG. 10A, and the flatteners 230 are in the closed position. The non-conforming dough balls 250 fall through the transfer tubes 170 and come to rest on the curved upper surfaces of the flatteners 230. The conveyor belt 14 is stopped, or in certain implementations, may be moving.

The controller causes the actuator to lower the loader plate 200 into the lowered position relative to the conveyor belt 14, as shown in FIG. 10B. Initially, the flattener doors 230 are still in the closed position as shown in FIG. 10A. The actuator causes the flatteners 230 to pivot in mutually opposite directions into an open position as shown in FIG. 10B (FIG. 11, step 630). The opening between the flatteners when they are in the open position is sized and dimensioned to allow conforming dough balls to pass through the opening 202 and non-conforming dough balls not to pass through the openings 202. After the flatteners 230 are sufficiently open and the open area or passage through the loader plate 200 is open, conforming dough balls will pass through the opening but non-conforming dough balls 250 will not pass through the opening. In some cases, the process of lowering the loader plate 200 and opening the flattening doors 230 occurs simultaneously.

The controller causes the actuator to raise the loader plate 200 into the raised position relative to the conveyor belt 14, as shown in FIG. 10C, with the flatteners 230 in their open position. The actuator moves the flatteners 230 to return the flatteners 230 to the closed position (step 640) at this stage in preparation for a "pre-pressing" step.

In this state, the sensor system 220 does not sense a laser beam 210 at the laser detector 206 since the laser beam 210 is still blocked by the non-conforming dough balls 250 and the laser beam 210 cannot pass through the apertures 208 of the cups 201 (FIG. 11, step 650). By not sensing the laser beam 210, the sensor system 220 determines that at least one dough ball is still present in the opening 202. The sensor system 220 further determines that a dough ball should not be present at this stage and therefore initiates a self-clearing process to remove the non-conforming dough ball 250 from the opening 202 (FIG. 11, step 660). In other words, a self-clearing process is triggered. The presence of a non-conforming dough ball 250 within the loader plate 200 can be referred to as a jam, abnormal condition, or other appropriate label. In some cases, the controller instructs the conveyor 14 to index forward before concluding that a non-conforming dough ball 250 is present.

However, the sequence of events of the comestible processing machine 10 depicted in 600 is simply an example of the events that can be used to trigger a self-clearing process. In general, the controller is configured to perform the steps including (i) detecting the presence of a dough ball, (ii) determining if the dough ball 150 should present or not at that particular moment and if so, defining this as a triggering event, and (iii) instructing a self-clearing process to clear the jam.

In some implementations, the detection can be performed with the loader plate 200 in the raised position relative to the conveyor belt 14, as shown in FIG. 10A or in the lowered position relative to the conveyor belt 14, as shown in FIG. 10B. The flatteners 230 can also be in the open configuration, as shown in FIG. 10B, or in the closed configuration, as shown in FIG. 10A. The flatteners 230 can also be partially opened, such as when pre-pressing as shown in FIG. 7G. There is no restriction on the position of the loader plate 200 or the position of the flatteners 230 during the sensing and triggering of the self-clearing process.

In some implementations, the sensing can be performed continuously or when a particular sequence of events occurs. For example, the sensor can check for the presence of dough balls 150 constantly and detect abnormal conditions based on irregularities in time, or the sensor can check for the presence of dough balls 150 when a particular sequence, such as after step 640 of process 600 is being performed. The sensing is performed quickly since the next batch of dough balls 150 is expected to be dropped onto the loader plate 200 within several seconds. In some cases, the detection is performed within 2 seconds of the jammed event occurring.

In some implementations, multiple apertures 208 can be disposed on the same side of a cup 201 for sensing a quantity of dough balls or other non-conformity. For example, a cup 201 with eight apertures configured to allow four laser beams to pass through, can be used to detect the presence of a dough ball or multiple dough balls in four locations within the opening 202. For example, with reference to FIG. 7D or 10A, if multiple apertures are provided, multiple dough balls could be sensed by the sensors and if this occurs, the controller can initiate the self-clearing process.

During the self-clearing process, the controller sends a signal to an actuator for the loader plate 200 to cause the loader plate 200 to actuate by, for example, translating, rotating, or vibrating. The controller can determine whether to translate, rotate, or vibrate depending on inputs received from sensors on the comestible processing machine 10 or from a history of previous non-conforming events.

Once the controller sends the signal to the actuator, the loader plate 200 moves to assist in removal of the non-conforming dough ball 250 from the opening 202. In one implementation, the controller sends a signal to the actuator to move the loader plate 200 into the lowered position relative to the conveyor belt 14 as it does during normal operation. In some cases, the controller can send a signal to begin with a gentle vibration and increase the frequency and/or amplitude of the vibration over time if the dough ball is not cleared from the opening. In some cases, the controller instructs the actuator to move the loader plate 200 against the conveyor belt 14 to assist in removing the non-conforming dough balls 250.

The controller can instruct the actuator of the loader plate 200 to repeat a cycle of the clearing process. The cycle can include an up-down-up movement of the loader plate 200, which can be performed any number of times. For example, an up-down-up cycle can be performed two or three times. Any movement of the loader plate 200 or flatteners 230 that begins and ends with the same configuration can define a cycle.

In some implementations, an air jet can be provided either on or near each opening 202. During the self-clearing process, the air jet is fired into the openings 202 after several cycles without clearing. In this way, air jets coupled to loader plate 200 assist in removal of the non-conforming dough balls 250.

In some implementations, subsequent dough balls are prevented from being deposited onto the loader plate 200 during the self-clearing process. In this case, the controller instructs the stoppage, suspension, or slow-down of the proofer 1300 and the former 1200 until the jam is cleared. This is performed quickly, typically within a few seconds. Dough balls 150 can be dropped from the proofer 1300 onto the loader plate 200 at rates of twenty times a minute, which can exacerbate the problem of a jammed event, and can cause the "snowball" effect previously described.

In some implementations, the various conveyors 14, 22, of the comestible processing machine 10 can maintain their operational speed while the clearing process is underway. This can be advantageous when the conveyor has a large inertia and is difficult to quickly start and stop. Is some cases, individual proofer trays of the proofer 1300 can be diverted from the transfer tubes 170 so that the dough balls 150 are not dropped into the transfer tubes 170 causing the previously mentioned "snowball" effect. In this way, the depositing of dough balls 150 from the proofer 1300 onto the loader plate 200 is suspended until the jam is removed. For example, the proofer trays can be controlled to pivot and dump the dough balls 150 within a container of the proofer 150. In another example, the dough balls 150 can recirculate around the proofer 1300 and be reused or reprocessed.

In some implementations, subsequent dough balls are prevented from being deposited onto the loader plate 200 during the self-clearing process using an alternate diversion process. In this case, dough balls are caught and diverted after they drop from the proofer 1300 and before they reach the loader plate 200. This diversion process can be implemented using a net or a sliding plate that is configured to deploy to catch the dough balls 150 when the self-clearing process is underway. Under normal operation of the comestible processing machine 10, the net or sliding plate would retract out of the way.

In some implementations, the flatbread press 1500 continues to operate without dough balls present during the self-clearing process. The controller can instruct the flatbread press 1500 to perform a clear-out process of the flatbread press 1500. The clear-out process allows both non-conforming and conforming dough balls 250, 150 on the conveyor 14 to be discharged from the comestible processing machine 10, so that the conveyor 14 is cleared. In some cases, components down the production line continue to operate. For example, the oven 1600, the cooler 1700, the monitoring station 1800, the counter-stacker 1900, and the bagger 2000 continue to operate during the self-clearing process and the clear-out process.

The controller can transmit a warning to operators 109 of the comestible processing machine 10 indicative of a status of a self-clearing process. For example, the warning can indicate that a jam has been detected and that a self-clearing process is underway. The controller can communicate the status of the self-clearing process to a display. In some cases, the warning may be audible, visual, or haptic. In some cases, a speaker or announcement can be broadcast indicating the status of the self-clearing process.

In order to assist in removing the non-conforming dough ball 250 from the opening 202, controller instructs the actuator controlling the flattener doors 230 to reopen the flattener doors 230. The controller instructs the actuator controlling the movement of the loader plate 200 to translate vertically, i.e., go up and down, as the flattening doors 230 are being closed. If the sensor system 220 continues to sense the presence of the non-conforming dough ball 250, the self-clearing process continues.

If the sensor system 220 senses that the non-conforming dough ball 250 has been cleared, the controller instructs the comestible processing machine 10 to resume normal operation or reset the production line. The sensor system 220 is configured to determine that the jam has been cleared when the laser beam 210 passes through all apertures 208 aligned with the laser beam 210 without obstruction and is received by the laser detector 206 on the opposite side of the loader plate 200 from the laser emitter 204. During the restart process, the controller instructs the conveyor 14 to resume forward motion, the flatbread press 1500 to reset, the proofer 1300 to restart, and the former 1200 to restart. In some systems, the proofer 1300 is not stopped during the jam clearing, but the suspension of the proofer's trays being tripped is effected, the reversal of which can be the aspect of the operation that is resumed by the controller once the jam has been confirmed to be cleared.

In some implementations, the controller can instruct the conveyor 14 to index forward while the loader plate 200 is in the lowered position. This motion causes the non-conforming dough ball 250 to be sheared forward, disposed between the conveyor belt 14 and the bottom of the flattening doors 230. If the shearing process is successful, the sensor system 220 would detect that the non-conforming dough ball 250 has been removed from the opening 202, e.g., the jam has been cleared, and the controller can instruct the comestible processing machine 10 to resume normal operation or reset operation.

In some cases, the shearing process is performed while reducing the amount of dough that extrudes into the crevices of the loader plate 200. For example, various heights of the loader plate 200 relative to the conveyor 14 can be used to perform this shearing process. For example, by starting with a large gap the risk that dough seeps into the crevices of the loader plate 200 is reduced. This gap can be reduced incrementally by the controller.

In some implementations, the sensing system includes an image-capturing device coupled to a controller at the entrance to the flatbread press 1500 to detect a quantity of dough balls entering the press on the conveyor 14. The controller is configured to detect a quantity of dough balls per row and compare the detected quantity to an expected quantity of dough balls.

For example, if the loader plate 200 is configured with a 5×5 pressing pattern, but only sees four dough balls entering the press, the controller instructs the press to only partially compress the dough balls. Partial compression of the dough balls forms the dough balls into cylindrical shapes indicative of a failed batch. The cylindrical dough then proceeds to the oven 1600 but are sorted away from the flatbread comestibles (indicative of a successful batch) upon exiting the flatbread press 1500 using a retracting mesh discharge. The retracting mesh discharge contains apertures that are dimensioned to allow the pressed cylindrical dough to fall through the mesh into a bin or onto a reject conveyor while the successful flatbread comestibles move over the top of the mesh and proceed to the oven 1600.

Once the non-conforming dough balls 250 have been removed from the loader plate 200 and are deposited on the conveyor belt 14, as shown in FIG. 10D, the controller commands the conveyor belt 14 to resume forward motion to move the non-conforming dough balls 250 away from the loader plate 200, as shown in FIG. 10E. The controller instructs the flatbread press 1500 not to press down on the non-conforming dough balls 250 as the non-conforming dough balls 250 pass through the press. In some cases, the non-conforming dough balls 250 exit the comestible processing machine 10 in the same discharge conveyor as the conforming dough balls 150. However, the rejected, non-conforming dough balls 250 do not get fully flattened by the flatbread press 1500.

In some implementations, the non-conforming dough balls 250 are conveyed to a reject or discharge conveyor. The reject conveyor is configured to discharge the non-conforming dough balls 250 from the comestible processing machine 10. In some examples, the non-conforming dough balls 250 are conveyed and deposited into a bin for disposal or recycling. In some examples, the conveyor belt 14 can be reversed so that the non-conforming dough balls 250 fall off an edge of the conveyor belt 14 onto a reject conveyor or into a bin. In some examples, the reject conveyor transfer the non-conforming dough balls 250 to a non-conforming comestible removal device such as another conveyor, bin, or a cart.

In some implementations, the controller can intermittently actuate the reject conveyor. For example, when a jam is not detected, the controller can be adapted to not actuate the reject conveyor. When the controller detects a non-conforming dough ball 250, the controller can cause the reject conveyor to actuate.

In some implementations, the loader plate 200 can begin receiving dough balls 150 again after the non-conforming dough balls 250 are placed on the reject conveyor or removed from the loader plate 200. For instance, when the loader plate 200 has removed the non-conforming dough balls 250 from the one or more openings 202 and placed the non-conforming dough balls 250 on the reject conveyor, the controller can send the comestible processing machine 10 a signal that indicates that the loader plate 200 can receive dough balls again.

If the self-clearing process is unsuccessful after multiple seconds, or for a quantity of cycles, e.g., three or four cycles of motion of the loader plate 200, the controller can instruct a temporary halt of the entire production line of the comestible processing machine 10 so that the operator 109 may manually clear the jam. The controller can trigger an alarm denoting an unsuccessful self-clearing attempt or attempts. The alarm may be audible, visual, or haptic. For example, a red spinning alarm or siren can be activated. In some cases, a speaker or announcement can be broadcast indicating the unsuccessful self-clearing attempt.

Controllers and computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A comestible processing machine comprising:
a loader plate comprising a plurality of spaced apart openings passing through the loader plate;
a first flattener and a second flattener i) pivotably attached to the loader plate at each of the plurality of spaced apart openings and ii) adapted to partially press a first comestible in an at least partially closed position after the first comestible has passed through the corresponding opening when the first flattener and the second flattener are in an open position;
a sensor configured to detect, through an aperture in a loading tube a) aligned over the opening for the pair of the first flattener and the second flattener and b) adapted to transfer a comestible to the pair of the first flattener and the second flattener, an obstruction; and
an actuator coupled to the loader plate and configured to i) assist in moving a pair of the first flattener and the second flattener from the open position to the at least partially closed position and ii) move the pair of the first flattener and the second flattener to remove the obstruction.

2. The comestible processing machine of claim 1, wherein the actuator is configured, to assist in removal of the obstruction, to (a) vibrate the loader plate and (b) move the pair of the first flattener and the second flattener.

3. The comestible processing machine of claim 1, further comprising a controller configured to stop one or more components of the comestible processing machine when the sensor detects the obstruction.

4. The comestible processing machine of claim 1, wherein:

the sensor is configured to detect, through each of multiple apertures in respective loading tubes for a row of openings in the loader plate, an obstruction; and
wherein the actuator is configured to move two or more pairs of first flatteners and second flatteners to remove the obstruction for the row of openings in the loader plate.

5. The comestible processing machine of claim 1, wherein the first flattener and the second flattener are adapted to partially press the first comestible in a partially closed position after the first comestible has passed through the corresponding opening when the first flattener and the second flattener are in an open position.

6. The comestible processing machine of claim 1, wherein the sensor comprises a camera.

7. A comestible processing machine, comprising:
a frame;
a conveyor belt supported on the frame;
a loader plate a) movably coupled to the frame and movable relative to the conveyor belt and b) comprising a plurality of spaced apart openings passing through the loader plate in a row;
two or more loading tubes each of which i) is aligned over a corresponding in the loader plate and ii) has an aperture within a threshold distance of a flattener, the two or more loading tubes aligned in the row in the comestible processing machine;
the flattener pivotably attached to the loader plate adjacent to a first opening of the plurality of spaced apart openings in the row that has a loading tube aligned over the opening;
a sensor for detecting, through the apertures in the two or more loading tubes aligned in the row in the comestible processing machine, a comestible disposed within one of the openings in the row; and
an actuator coupled to the loader plate and configured to assist in removal of the comestible from within the opening when the sensor detects, through the apertures in the two or more loading tubes aligned in the row in the comestible processing machine, the comestible disclosed within the one of the openings in the row.

8. The comestible processing machine of claim 7, wherein the actuator is configured to pivot the flattener to assist in the removal of the comestible.

9. The comestible processing machine of claim 7, wherein the actuator is configured to move the loader plate to assist in the removal of the comestible from the opening.

10. The comestible processing machine of claim 7, wherein the sensor is coupled to the loader plate.

11. A method comprising:
maintaining a pair of opposing flatteners in a closed position;
transporting a comestible through a tube, onto upper surfaces of the pair of opposing flatteners, with the pair of opposing flatteners in the closed position;
pivoting the pair of opposing flatteners from the closed position in which the comestible is supported on the upper surfaces in mutually opposite directions into an open position to create an opening between the pair of opposing flatteners through which the comestible may pass onto a lower component;
pivoting, while the comestible is on the lower component below the pair of opposing flatteners, the pair of opposing flatteners to an at least partially closed position to partially press the comestible;

sensing, using a sensor that receives a signal that passes through an aperture in the tube, whether an obstruction is in the tube or the corresponding opening; and in response to detecting that an obstruction is in the tube or the corresponding opening, removing the obstruction from the tube or the corresponding opening.

12. The method of claim 11, wherein removing the obstruction comprises actuating a loader plate that comprises an opening at which the pair of opposing flatteners are located to remove the obstruction from the tube or the opening.

13. The method of claim 12, wherein actuating the loader plate comprises vibrating the loader plate while pivoting the pair of opposing flatteners to remove the obstruction from the tube or the opening.

14. The method of claim 11, wherein sensing the obstruction comprises one of detecting whether a laser beam is received by a laser beam detector, detecting whether the laser beam is obstructed, or detecting the obstruction using an image capturing device.

15. The method of claim 11, wherein removing the obstruction from the tube or the corresponding opening comprises injecting air into the opening.

16. The method of claim 11, further comprising stopping a component of a comestible processing machine that includes the tube and the pair of opposing flatteners upon sensing the obstruction in the tube or the corresponding opening.

17. The method of claim 11, wherein pivoting the pair of opposing flatteners to the at least partially closed position comprises pivoting the pair of opposing flatteners to a partially closed position to partially press the comestible.

18. The method of claim 11, wherein:
sensing whether an obstruction is in the tube or the corresponding opening comprises determining whether an obstruction is expected to be in the tube or the corresponding opening; and
removing the obstruction from the tube or the corresponding opening is responsive to determining that an obstruction is not expected to be in the tube or the corresponding opening.

19. The method of claim 11, wherein:
sensing whether an obstruction is in the tube or the corresponding opening comprises determining, using sensor data captured during a time period according to a process sequence, whether an obstruction is in the tube or the corresponding opening; and
removing the obstruction from the tube or the corresponding opening is responsive to determining, using the sensor data captured during the time period according to the process sequence, that an obstruction is in the tube or the corresponding opening.

20. The method of claim 11, wherein maintaining the pair of opposing flatteners in the closed position comprises maintaining, for the pair of opposing flatteners coupled to a loader plate in a first position, the pair of opposing flatteners in the closed position,
the method comprising moving the loader plate from the first position to a second, different position while a) the comestible passes through the opening or b) removing the obstruction from the tube or the corresponding opening.

21. A comestible processing machine comprising:
a loader plate comprising a plurality of spaced apart openings passing through the loader plate;
a first flattener and a second flattener i) pivotably attached to the loader plate at each of the plurality of spaced apart openings, ii) adapted to partially press a first comestible in a partially closed position after the first comestible has passed through the corresponding opening when the first flattener and the second flattener are in an open position, and iii) adapted to second partially press the first comestible while in a closed position after the first flattener and the second flattener partially press the first comestible in the partially closed position, and
an actuator coupled to the loader plate and configured to assist in moving a pair of the first flattener and the second flattener from the open position to the partially closed position.

22. A method comprising:
maintaining a pair of opposing flatteners in a closed position;
transporting a comestible through a tube, onto upper surfaces of the pair of opposing flatteners, with the pair of opposing flatteners in the closed position;
pivoting the pair of opposing flatteners from the closed position in which the comestible is supported on the upper surfaces in mutually opposite directions into an open position to create an opening between the pair of opposing flatteners through which the comestible may pass onto a lower component;
pivoting, while the comestible is on the lower component below the pair of opposing flatteners, the pair of opposing flatteners to a partially closed position to partially press the comestible; and
after pivoting the pair of opposing flatteners to the partially closed position to partially press the comestible:
raising the pair of opposing flatteners away from the comestible; and
pivoting the pair of opposing flatteners to the closed position to second partially press the comestible.

23. A comestible processing machine comprising:
a frame;
a loader plate moveably attached to the frame and comprising a plurality of spaced apart openings passing through the loader plate;
a first actuator coupled to the frame and configured to move the loader plate from a first position to a second position;
a first flattener and a second flattener i) pivotably attached to the loader plate at each of the plurality of spaced apart openings and ii) adapted to create a passage to the corresponding opening through which a comestible can pass when the first flattener and the second flattener are in an open position; and
a second, different actuator coupled to the loader plate and configured to assist in moving a pair of the first flattener and the second flattener from the open position to a non-open position.

24. The comestible processing machine of claim 23, wherein the first actuator is configured to move the loader plate from the first position to the second position during at least one of a comestible flattening process or an obstruction removal process.

25. A method comprising:
maintaining, for a pair of opposing flatteners coupled to a loader plate in a first position, the pair of opposing flatteners in a closed position;
receiving, by the pair of opposing flatteners in the closed position and through a tube, a comestible;
pivoting, from the closed position in which the comestible is supported by the pair of opposing flatteners and into an open position, the pair of opposing flatteners in opposite directions to create an opening between the pair of opposing flatteners through which the comestible may pass onto a lower component; and moving the loader plate from the first position to a second, different position while the comestible passes through the opening.

26. The method of claim 25, wherein pivoting the pair of opposing flatteners occurs at least partially concurrently with moving the loader plate from the first position to the second, different position.

* * * * *

UNITED STATES PATENT AND TRADEMARK OFFICE
CERTIFICATE OF CORRECTION

| | |
|---|---|
| PATENT NO. | : 11,744,252 B2 |
| APPLICATION NO. | : 16/813521 |
| DATED | : September 5, 2023 |
| INVENTOR(S) | : Eric Clay Lawrence |

It is certified that error appears in the above-identified patent and that said Letters Patent is hereby corrected as shown below:

In the Claims

Column 24, Lines 8-9, in Claim 21, delete "position, and" insert --position; and--.

Signed and Sealed this
Thirty-first Day of October, 2023

Katherine Kelly Vidal
*Director of the United States Patent and Trademark Office*